United States Patent
Kang et al.

(10) Patent No.: US 12,516,942 B2
(45) Date of Patent: Jan. 6, 2026

(54) NAVIGATION METHOD, DEVICE, AND SYSTEM

(71) Applicant: HUAWEI TECHNOLOGIES CO., LTD., Guangdong (CN)

(72) Inventors: Zehui Kang, Beijing (CN); Hao Yang, Wuhan (CN); Weiyang Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/180,164

(22) Filed: Mar. 8, 2023

(65) Prior Publication Data

US 2023/0266132 A1 Aug. 24, 2023

Related U.S. Application Data

(63) Continuation of application No. PCT/CN2021/116898, filed on Sep. 7, 2021.

(30) Foreign Application Priority Data

Sep. 9, 2020 (CN) .......................... 202010943754.6

(51) Int. Cl.
*G01C 21/34* (2006.01)
*G01C 21/36* (2006.01)

(52) U.S. Cl.
CPC ..... *G01C 21/3446* (2013.01); *G01C 21/3632* (2013.01)

(58) Field of Classification Search
CPC .......... G01C 21/3446; G01C 21/3632; G01C 21/30; G01C 21/3415; G01C 21/3492
See application file for complete search history.

(56) References Cited

U.S. PATENT DOCUMENTS

| 5,916,299 A | 6/1999 | Poppen |
| 2013/0245932 A1 | 9/2013 | Beaurepaire et al. |

(Continued)

FOREIGN PATENT DOCUMENTS

| CN | 101634568 A | 1/2010 |
| CN | 104215237 A | 12/2014 |

(Continued)

OTHER PUBLICATIONS

Office Action issued in CN202010943754.6, dated Aug. 3, 2023, 9 pages.

(Continued)

*Primary Examiner* — Toya Pettiegrew

(57) ABSTRACT

A navigation method, device, and system are provided in this application. The method includes: obtaining a first target location and a second target location (101), where the first target location is a location closest to a start location on K road segments, the second target location is a location closest to an end location on the K road segments, and K is a positive integer; obtaining a first path from the first target location to the second target location based on a vector pathfinding algorithm and the K road segments (102); obtaining a second path from the start location to the first target location and a third path from the second target location to the end location (103); and determining a fourth path from the start location to the end location (104).

17 Claims, 13 Drawing Sheets

(56) References Cited

U.S. PATENT DOCUMENTS

| | | | | | |
|---|---|---|---|---|---|
| 2013/0282272 | A1* | 10/2013 | Kluge | ................ | G01C 21/3469 |
| | | | | | 701/425 |
| 2013/0328879 | A1* | 12/2013 | Carbonneau | ....... | G01C 21/3881 |
| | | | | | 345/440 |
| 2018/0112993 | A1* | 4/2018 | Schpok | ................... | G06F 18/24 |
| 2021/0316780 | A1* | 10/2021 | Zhu | ...................... | B62D 5/0457 |
| 2022/0214178 | A1* | 7/2022 | Zhang | ................ | G01C 21/3423 |

FOREIGN PATENT DOCUMENTS

| | | | |
|---|---|---|---|
| CN | 105424045 A | | 3/2016 |
| CN | 105509742 A | | 4/2016 |
| CN | 105628035 A | | 6/2016 |
| CN | 108253984 A | | 7/2018 |
| CN | 109115232 A | | 1/2019 |
| CN | 109947100 A | * | 6/2019 |
| CN | 110132260 A | | 8/2019 |
| CN | 111220157 A | | 6/2020 |
| CN | 111256722 A | | 6/2020 |
| CN | 111344535 A | | 6/2020 |

OTHER PUBLICATIONS

International Search Report issued in PCT/CN2021/116898, dated Dec. 1, 2021, 11 pages.

* cited by examiner

NAVIGATION METHOD, DEVICE, AND SYSTEM

CROSS-REFERENCE TO RELATED APPLICATIONS

This application is a continuation of International Application No. PCT/CN2021/116898, filed on Sep. 7, 2021, which claims priority to Chinese Patent Application No. 202010943754.6, filed on Sep. 9, 2020. The disclosures of the aforementioned applications are hereby incorporated by reference in their entireties.

TECHNICAL FIELD

Embodiments of this application relate to the field of navigation technologies, and in particular, to a navigation method, device, and system.

BACKGROUND

With increasing complexity of roads and increasing popularity of terminal devices, a navigation technology has become an indispensable technology in people's life.

Currently, a vector pathfinding algorithm is mainly for navigation. Specifically, road network data is first obtained, then a path from a start location to an end location is planned based on the road network data, and finally navigation is performed by using the planned path.

However, the vector pathfinding algorithm needs to depend on road network data for navigation. When road network data in some regions is sparse, accuracy of a planned path is poor.

SUMMARY

Embodiments of this application provide a navigation method, device, and system, to accurately plan a path for navigation.

A first aspect of embodiments of this application provides a navigation method, which may be applied to a server, and includes: obtaining a first target location and a second target location, where the first target location is a location closest to a start location on K preset road segments, the second target location is a location closest to an end location on the K road segments, and K is a positive integer; and the start location and the end location may be sent by a terminal device to the server; obtaining a first path from the first target location to the second target location based on a vector pathfinding algorithm and the K road segments; obtaining a second path from the start location to the first target location and a third path from the second target location to the end location based on a raster pathfinding algorithm, where the raster pathfinding algorithm includes but is not limited to an A* algorithm, a Dijkstra algorithm, and a JPS algorithm; and generating a fourth path from the start location to the end location based on the first path, the second path, and the third path, where the fourth path is for navigation. Specifically, the first path, the second path, and the third path may be spliced, and some redundant and repeated paths are removed, to obtain the fourth path.

The first path between the first target location and the second target location is planned by using the vector pathfinding algorithm, to improve planning efficiency of the fourth path from the start location to the end location; and in a region in which an obstacle exists or a region in which a path cannot be planned by using the vector pathfinding algorithm because a road network is sparse, the second path between the start location and the first target location and the third path between the end location and the second target location are planned by using the raster pathfinding algorithm, to improve accuracy and precision of the fourth path from the start location to the end location, so that the fourth path can well avoid an obstacle. Therefore, this embodiment of this application is better applicable to high-precision AR walk navigation.

In an implementation, the obtaining a first target location includes: determining, based on three-dimensional data of the start location and three-dimensional data of the K road segments, a road segment closest to the start location on the K road segments, where the three-dimensional data is mainly three-dimensional coordinates, the three-dimensional data of the start location is three-dimensional coordinates of the start location, and the three-dimensional data of the K road segments includes three-dimensional coordinates of each location on the K road segments; and determining the first target location from the road segment closest to the start location. For example, distances between the start location and locations on the road segment closest to the start location may be calculated, and then the first target location may be determined by comparing the distances. For example, the first target location may alternatively be determined by making a vertical line.

Compared with determining a first target location without considering height data, determining, based on the three-dimensional data of the start location and the three-dimensional data of the K road segments, the road segment closest to the start location on the K road segments, and then determining the first target location from the road segment closest to the start location can avoid a "dramatic height deviation" error guidance caused because a large height difference exists on a path planned based on the first target location.

In an implementation, the determining, based on three-dimensional data of the start location and three-dimensional data of the K road segments, a road segment closest to the start location on the K road segments includes: determining, from a plurality of layers of regions included in a walkable region and based on height data of the start location and height data of the walkable region, a target layer region in which the start location is located, where the target layer region is one of the plurality of layers of regions; determining, based on height data of the K road segments, V road segments included in the target layer region in which the start location is located, where V is a positive integer less than or equal to K; and determining, from the V road segments and based on data of a horizontal direction of the start location and data of a horizontal direction of the V road segments, a road segment closest to the start location.

The target layer region in which the start location is located is determined by using the walkable region, and then the target layer region needs to be searched for the road segment closest to the start location, so that efficiency of determining the road segment closest to the start location can be improved.

In an implementation, the determining, based on three-dimensional data of the start location and three-dimensional data of the K road segments, a road segment closest to the start location on the K road segments includes: determining, from the K road segments and based on the data of the horizontal direction of the start location and the data of the horizontal direction of the K road segments, M road segments whose distances from the start location in a horizontal direction are less than a first threshold, where M is a positive integer less than or equal to K, and the first threshold may be adjusted based on an actual requirement; determining, from the M road segments and based on the height data of the start location and height data of the M road segments, N road segments that meet a target condition, where N is a positive integer less than or equal to M; and determining, from the N road segments and based on the three-dimensional data of the start location and the three-dimensional data of the K road segments, the road segment closest to the start location.

In this implementation, the K road segments are separately screened from a horizontal direction and a height, to avoid a case in which the determined road segment closest to the start location is inaccurate because a road segment is close to the start location in the horizontal direction or the height. In addition, in this embodiment of this application, a selection range of a road segment is first narrowed from a horizontal direction and a height, so that efficiency of determining the road segment closest to the start location can be improved.

In an implementation, the determining, based on three-dimensional data of the start location and three-dimensional data of the K road segments, a road segment closest to the start location on the K road segments includes: determining, from a plurality of layers of regions included in a walkable region and based on height data of the start location and height data of the walkable region, a target layer region in which the start location is located; and if a road segment exists in the target layer region, determining, based on height data of the K road segments, V road segments included in the target layer region in which the start location is located, where V is a positive integer less than or equal to K; and determining, from the V road segments and based on data of a horizontal direction of the start location and data of a horizontal direction of the V road segments, a road segment closest to the start location; or if no road segment exists in the target layer region, determining, from the K road segments and based on data of a horizontal direction of the start location and data of a horizontal direction of the K road segments, M road segments whose distances from the start location in a horizontal direction are less than a first threshold, where M is a positive integer less than or equal to K, and the first threshold may be adjusted based on an actual requirement; determining, from the M road segments and based on the height data of the start location and height data of the M road segments, N road segments that meet a target condition, where N is a positive integer less than or equal to M; and determining, from the N road segments and based on the three-dimensional data of the start location and the three-dimensional data of the K road segments, a road segment closest to the start location.

In this implementation, a method for searching, by using the target layer region, for the road segment closest to the start location is combined with a method for searching, based on the three-dimensional data of the start location, for the road segment closest to the start location. The road segment closest to the start location is first searched for by using the target layer region, to improve efficiency of searching for the road segment closest to the start location; and when the method for searching, by using the target layer region, for the road segment closest to the start location fails, then the road segment closest to the start location is searched for based on the three-dimensional data of the start location, to avoid a case in which the road segment closest to the start location cannot be found due to incomplete data of the walkable region.

In an implementation, the target condition includes: a value of height data of a road segment is greater than a difference between a value of the height data of the start location and a second threshold, and is less than a sum of the value of the height data of the start location and a third threshold. The second threshold and the third threshold may be set based on an actual requirement.

A search range of the road segment closest to the start location may be narrowed by using the foregoing target condition.

In an implementation, the second threshold is less than the third threshold. This implementation is applicable to a case in which accuracy of height data of the start location is high.

In an implementation, the second threshold is equal to the third threshold. This implementation is applicable to a case in which accuracy of height data of the start location is low.

In an implementation, the obtaining a second path from the start location to the first target location based on a raster pathfinding algorithm includes: obtaining P rasters constituting a walkable region, where the P rasters include a raster corresponding to the start location and a raster corresponding to the end location, and P is a positive integer greater than 2; selecting one candidate raster from Q candidate rasters as a raster corresponding to a third target location, where the Q candidate rasters belong to the P rasters, and Q is a positive integer less than P; connecting the raster corresponding to the start location and the raster corresponding to the third target location; selecting one candidate raster from L candidate rasters as a raster corresponding to a fourth target location, where the L candidate rasters belong to the P rasters, and L is a positive integer less than P; connecting the raster corresponding to the third target location and the raster corresponding to the fourth target location; and repeating the foregoing steps until a raster corresponding to the first target location is connected, to obtain the second path from the start location to the first target location.

This implementation provides a specific solution of obtaining the second path based on the raster pathfinding algorithm.

In an implementation, the L candidate rasters neither include the Q candidate rasters, nor include at least one raster that meets a target location relationship with the Q candidate rasters.

Because the L candidate rasters neither include the Q candidate rasters, nor include the at least one raster that meets the target location relationship with the Q candidate rasters, repeated screening of the Q candidate rasters is avoided, and efficiency of traversing the P rasters can be improved, to improve efficiency of obtaining the second path, and reduce time for obtaining the second path.

In an implementation, after the obtaining P rasters constituting a walkable region, and before the selecting one raster from Q candidate rasters as a raster corresponding to a third target location, the method further includes: selecting the Q candidate rasters from the P rasters according to a selection rule, where the selection rule includes coordinates of a first horizontal direction of the candidate raster and coordinates of a second horizontal direction of the candidate raster, and the first horizontal direction is perpendicular to the second horizontal direction; the coordinates of the first horizontal direction of the candidate raster are equal to a sum of coordinates of a first horizontal direction of the raster corresponding to the start location and a first offset, the first offset is equal to a product of a first step and a cosine value of a first angle, the first step is equal to a sum of an initial step and a first step increment, the step increment is equal to a product of a first quantity of accumulation times and a step increment accumulated each time, the first angle is equal to a sum of an initial angle and a first angle increment, and the first angle increment is equal to a product of a second quantity of accumulation times and an angle increment accumulated each time; and the coordinates of the second horizontal direction of the candidate raster are equal to a sum of coordinates of a second horizontal direction of the raster corresponding to the start location and a second offset, and the second offset is equal to a product of the first step and a sine value of the first angle.

According to the foregoing selection rule, a selection direction of the candidate raster may be flexibly adjusted, to select a candidate raster from each direction, so that the finally determined third target location is more proper.

In an implementation, the method further includes: optimizing the fourth path.

A length of the fourth path can be shortened through optimization, so that a user can reach the end location more quickly, to improve user experience.

In an implementation, the optimizing the fourth path includes: determining an optimizable region in the walkable region; and optimizing a part that is of the fourth path and that is located in the optimizable region.

The optimizable region is determined from the walkable region, and the fourth path is optimized based on the optimizable region, to avoid a case in which a long optimization time is consumed but a good optimization effect cannot be achieved.

In an implementation, a fifth target location and a sixth target location exist on the fourth path, and both the fifth target location and the sixth target location are located in the optimizable region; and the optimizing a part that is of the fourth path and that is located in the optimizable region includes: replacing a non-linear path with a linear path from the fifth target location to the sixth target location based on a fact that no obstacle exists between the fifth target location and the sixth target location and a part that is of the fourth path and that is located between the fifth target location and the sixth target location is the non-linear path, so that a length of the fourth path can be shortened.

Because the fifth target location and the sixth target location are located in the optimizable region, and no obstacle exists between the fifth target location and the sixth target location, replacing the non-linear path between the fifth target location and the sixth target location with the linear path can shorten the length of the fourth path.

In an implementation, the method further includes: sending the fourth path to a terminal device, so that the terminal device performs navigation based on the fourth path.

The server sends the fourth path to the terminal device. In this way, the terminal device can perform navigation based on the fourth path.

A second aspect of embodiments of this application provides a navigation method, which may be applied to a terminal device and includes: obtaining a fourth path from a start location to an end location, where specifically, the terminal device may plan the fourth path by using the navigation method according to the first aspect, or may receive the fourth path sent by a server; displaying the fourth path; and displaying a guiding line based on a location of a user and a location of the fourth path, where the guiding line indicates the user to move along the fourth path toward the end location, and the location of the user may be a real-time location.

The guiding line is displayed based on the location of the user and the location of the fourth path, so that the guiding line can be adjusted in a timely manner, and the user can be accurately guided to move along the fourth path.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location; and the displaying a guiding line based on a location of a user and a location of the fourth path includes: displaying the guiding line from the location of the user to the second reference location based on a fact that the location of the user and the third reference location are on a same side of the first subpath and the location of the user is between an angle bisector of the target angle and the first subpath.

In the scenario in this implementation, the guiding line from the location of the user to the second reference location is displayed, so that the user can be accurately guided to move along the fourth path.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location; and the displaying a guiding line based on a location of a user and a location of the fourth path includes: displaying the guiding line from the location of the user to the third reference location based on a fact that the location of the user and the third reference location are on a same side of the first subpath and the location of the user is between an angle bisector of the target angle and the second subpath.

In the scenario in this implementation, the guiding line from the location of the user to the third reference location is displayed, so that the user can be accurately guided to move along the fourth path.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location; and the displaying a guiding line based on a location of a user and a location of the fourth path includes: displaying the guiding line from the location of the user to the second reference location based on a fact that the location of the user and the third reference location are on both sides of the first subpath and the location of the user and the first reference location are on a same side of a reverse extension line of the second subpath.

In the scenario in this implementation, the guiding line from the location of the user to the second reference location is displayed, so that the user can be accurately guided to move along the fourth path.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location; and the displaying a guiding line based on a location of a user and a location of the fourth path includes: displaying the guiding line from the location of the user to the third reference location based on a fact that the location of the user and the third reference location are on both sides of the first subpath and the location of the user and the first reference location are on both sides of a reverse extension line of the second subpath.

In the scenario in this implementation, the guiding line from the location of the user to the third reference location is displayed, so that the user can be accurately guided to move along the fourth path.

In an implementation, the fourth path is formed by sequentially connecting a plurality of reference locations, a height of the guiding line at a fourth reference location is equal to a sum of a height of the fourth reference location and a specific height, and the fourth reference location is any one of the plurality of reference locations.

Because relative heights of the guiding line and a location of the guiding line are determined, a height change of the fourth path can be vividly presented to the user, to improve user experience.

In an implementation, the fourth path is formed by sequentially connecting a plurality of reference locations. The method further includes: displaying indication information based on a fact that the location of the user is located in an elevator region and attribute information of a fifth reference location indicates the user to take the elevator, where the indication information indicates the user to take the elevator, and the fifth reference location is a reference location closest to the location of the user in the plurality of reference locations.

The indication information is displayed to prompt the user to take the elevator, so that it can be ensured that the user accurately walks along the fourth path in a complex elevator scenario.

A third aspect of embodiments of this application provides a navigation apparatus. The navigation apparatus may be applied to a server and includes:

a location obtaining unit, configured to obtain a first target location and a second target location, where the first target location is a location closest to a start location on K road segments, the second target location is a location closest to an end location on the K road segments, and K is a positive integer; a path obtaining unit, configured to obtain a first path from the first target location to the second target location based on a vector pathfinding algorithm and the K road segments, where the path obtaining unit is further configured to obtain a second path from the start location to the first target location and a third path from the second target location to the end location based on a raster pathfinding algorithm; and a path generation unit, configured to generate a fourth path from the start location to the end location based on the first path, the second path, and the third path, where the fourth path is for navigation.

In an implementation, the location obtaining unit is configured to: determine, based on three-dimensional data of the start location and three-dimensional data of the K road segments, a road segment closest to the start location on the K road segments; and determine the first target location from the road segment closest to the start location.

In an implementation, the location obtaining unit is configured to: determine, from a plurality of layers of regions included in a walkable region and based on height data of the start location and height data of the walkable region, a target layer region in which the start location is located, where the target layer region is one of the plurality of layers of regions; determine, based on height data of the K road segments, V road segments included in the target layer region in which the start location is located, where V is a positive integer less than or equal to K; and determine, from the V road segments and based on data of a horizontal direction of the start location and data of a horizontal direction of the V road segments, a road segment closest to the start location.

In an implementation, the location obtaining unit is configured to: determine, from the K road segments and based on the data of the horizontal direction of the start location and the data of the horizontal direction of the K road segments, M road segments whose distances from the start location in a horizontal direction are less than a first threshold, where M is a positive integer less than or equal to K; determine, from the M road segments and based on the height data of the start location and height data of the M road segments, N road segments that meet a target condition, where N is a positive integer less than or equal to M; and determine, from the N road segments and based on the three-dimensional data of the start location and the three-dimensional data of the K road segments, the road segment closest to the start location.

In an implementation, the target condition includes: a value of height data of a road segment is greater than a difference between a value of the height data of the start location and a third threshold, and is less than a sum of the value of the height data of the start location and a second threshold.

In an implementation, the second threshold is less than the third threshold.

In an implementation, the path obtaining unit is configured to: obtain P rasters constituting a walkable region, where the P rasters include a raster corresponding to the start location and a raster corresponding to the end location, and P is a positive integer greater than 2; select one candidate raster from Q candidate rasters as a raster corresponding to a third target location, where the Q candidate rasters belong to the P rasters, and Q is a positive integer less than P; connect the raster corresponding to the start location and the raster corresponding to the third target location; select one candidate raster from L candidate rasters as a raster corresponding to a fourth target location, where the L candidate rasters belong to the P rasters, and L is a positive integer less than P; connect the raster corresponding to the third target location and the raster corresponding to the fourth target location; and repeat the foregoing steps until a raster corresponding to the first target location is connected, to obtain the second path from the start location to the first target location.

In an implementation, the L candidate rasters neither include the Q candidate rasters, nor include at least one raster that meets a target location relationship with the Q candidate rasters.

In an implementation, the path obtaining unit is further configured to select the Q candidate rasters from the P rasters according to a selection rule, where the selection rule includes coordinates of a first horizontal direction of the candidate raster and coordinates of a second horizontal direction of the candidate raster, and the first horizontal direction is perpendicular to the second horizontal direction; the coordinates of the first horizontal direction of the candidate raster are equal to a sum of coordinates of a first horizontal direction of the raster corresponding to the start location and a first offset, the first offset is equal to a product of a first step and a cosine value of a first angle, the first step is equal to a sum of an initial step and a first step increment, the step increment is equal to a product of a first quantity of accumulation times and a step increment accumulated each time, the first angle is equal to a sum of an initial angle and a first angle increment, and the first angle increment is equal to a product of a second quantity of accumulation times and an angle increment accumulated each time; and the coordinates of the second horizontal direction of the candidate raster are equal to a sum of coordinates of a second horizontal direction of the raster corresponding to the start location and a second offset, and the second offset is equal to a product of the first step and a sine value of the first angle.

In an implementation, the navigation apparatus further includes an optimization unit, configured to optimize the fourth path.

In an implementation, the optimization unit is configured to: determine an optimizable region in the walkable region; and optimize a part that is of the fourth path and that is located in the optimizable region.

In an implementation, a fifth target location and a sixth target location exist on the fourth path, and both the fifth target location and the sixth target location are located in the optimizable region.

The optimization unit is configured to replace a non-linear path with a linear path from the fifth target location to the sixth target location based on a fact that no obstacle exists between the fifth target location and the sixth target location and a part that is of the fourth path and that is located between the fifth target location and the sixth target location is the non-linear path.

In an implementation, the navigation apparatus further includes a sending unit, configured to send the fourth path to a terminal device, so that the terminal device performs navigation based on the fourth path.

For specific implementations, related descriptions, and technical effects of the foregoing units, refer to descriptions in the first aspect of embodiments of this application.

A fourth aspect of embodiments of this application provides a navigation apparatus, including: an obtaining unit, configured to obtain a fourth path from a start location to an end location; and a display unit, configured to display the fourth path. The display unit is further configured to display a guiding line based on a location of a user and a location of the fourth path, where the guiding line indicates the user to move along the fourth path toward the end location.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location. The display unit is configured to display the guiding line from the location of the user to the second reference location based on a fact that the location of the user and the third reference location are on a same side of the first subpath and the location of the user is between an angle bisector of the target angle and the first subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location. The display unit is configured to display the guiding line from the location of the user to the third reference location based on a fact that the location of the user and the third reference location are on a same side of the first subpath and the location of the user is between an angle bisector of the target angle and the second subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location. The display unit is configured to display the guiding line from the location of the user to the second reference location based on a fact that the location of the user and the third reference location are on both sides of the first subpath and the location of the user and the first reference location are on a same side of a reverse extension line of the second subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location. The display unit is configured to display the guiding line from the location of the user to the third reference location based on a fact that the location of the user and the third reference location are on both sides of the first subpath and the location of the user and the first reference location are on both sides of a reverse extension line of the second subpath.

In an implementation, the fourth path is formed by sequentially connecting a plurality of reference locations, a height of the guiding line at a fourth reference location is equal to a sum of a height of the fourth reference location and a specific height, and the fourth reference location is any one of the plurality of reference locations.

In an implementation, the fourth path is formed by sequentially connecting a plurality of reference locations. The display unit is further configured to display indication information based on a fact that the location of the user is located in an elevator region and attribute information of a fifth reference location indicates the user to take the elevator, where the indication information indicates the user to take the elevator, and the fifth reference location is a reference location closest to the location of the user in the plurality of reference locations.

For specific implementations, related descriptions, and technical effects of the foregoing units, refer to descriptions in the second aspect of embodiments of this application.

A fifth aspect of embodiments of this application provides a server, including at least one processor and a memory. The memory stores computer executable instructions that can be run on the processor, and when the computer executable instructions are executed by the processor, the processor performs the navigation method according to any implementation of the first aspect.

A sixth aspect of embodiments of this application provides a terminal device, including at least one processor and a memory. The memory stores computer executable instructions that can be run on the processor, and when the computer executable instructions are executed by the processor, the processor performs the navigation method according to any implementation of the second aspect.

A seventh aspect of embodiments of this application provides a chip or a chip system. The chip or the chip system includes at least one processor and a communications interface. The communications interface is interconnected to the at least one processor through a line. The at least one processor is configured to run a computer program or instructions, to perform the navigation method according to any implementation of the first aspect.

An eighth aspect of embodiments of this application provides a chip or a chip system. The chip or the chip system includes at least one processor and a communications interface. The communications interface is interconnected to the at least one processor through a line. The at least one processor is configured to run a computer program or instructions, to perform the navigation method according to any implementation of the first aspect.

A ninth aspect of embodiments of this application provides a computer-readable storage medium storing one or more computer-executable instructions. When the computer-executable instructions are executed by a processor, the processor performs the navigation method according to any implementation of the first aspect, or the navigation method according to any implementation of the second aspect.

A tenth aspect of embodiments of this application provides a computer program product. The computer program product includes computer software instructions, and the computer software instructions may be loaded by a processor to implement the navigation method according to any implementation of the first aspect, or the navigation method according to any implementation of the second aspect.

An eleventh aspect of embodiments of this application provides a navigation system, including a terminal device and a server.

The server is configured to perform the navigation method according to any implementation of the first aspect.

The terminal device is configured to perform the navigation method according to any implementation of the second aspect.

It can be learned from the foregoing technical solutions that embodiments of this application have the following advantages:

The first path between the first target location and the second target location is planned by using the vector pathfinding algorithm, to improve planning efficiency of the fourth path from the start location to the end location; and the second path between the start location and the first target location and the third path between the end location and the second target location are planned by using the raster pathfinding algorithm, to improve accuracy and precision of the fourth path from the start location to the end location, so that the fourth path can well avoid an obstacle. Therefore, embodiments of this application are better applicable to high-precision AR walk navigation.

DESCRIPTION OF EMBODIMENTS

The following describes embodiments of the present invention with reference to the accompanying drawings in embodiments of the present invention. Terms used in embodiments of the present invention are merely intended to explain specific embodiments of the present invention, and are not intended to limit the present invention.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
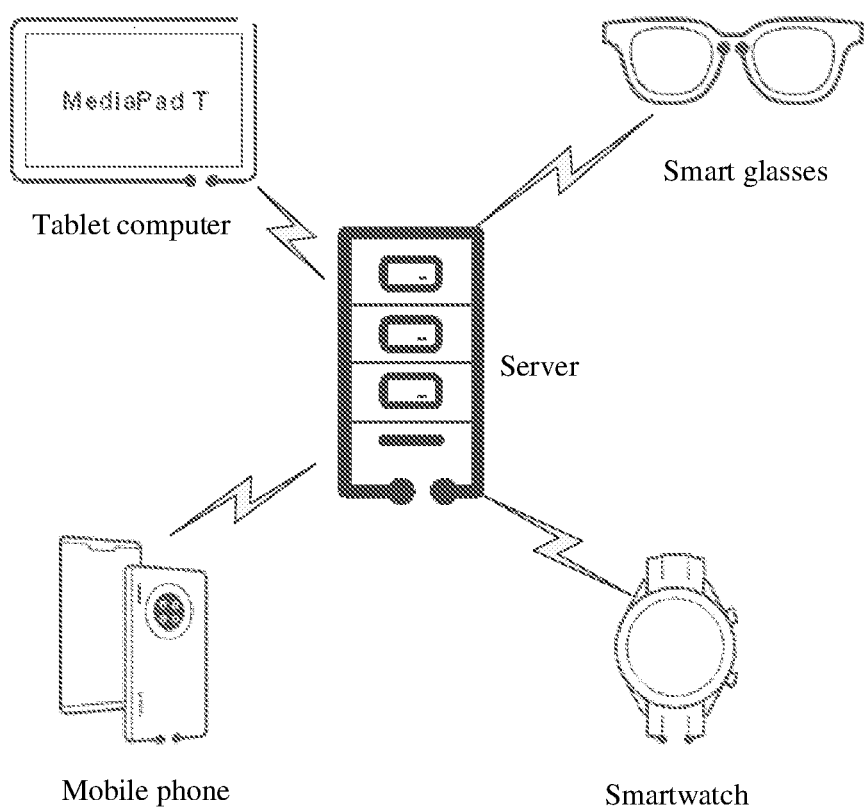
FIG. 1 is a schematic diagram of a framework of a navigation system according to an embodiment of this application.

Embodiments of this application may be applied to a navigation system shown in FIG. 1. As shown in FIG. 1, the navigation system includes a terminal device and a server. The terminal device may be any device on which navigation software can be installed. For example, the terminal device may be a mobile phone, a tablet computer, a smartwatch, smart glasses, a vehicle-mounted navigation device, or the like.

The navigation system shown in FIG. 1 is used as an example. A user performs an operation on the terminal device, so that the terminal device enters a navigation interface. The terminal device sends a navigation request to the server, where the navigation request may include a plurality of types of navigation-related information such as three-dimensional data of a start location, three-dimensional data of an end location, and information about the start location. After responding to the navigation request, the server plans a path from the start location to the end location, and then sends the path to the terminal device. The terminal device performs navigation based on the path.

A navigation method provided in embodiments of this application includes two parts. One part is used by a server to plan a path from a start location to an end location, and the other part is used by a terminal device to perform navigation. The following separately describes, from perspectives of a terminal device side and a server side, the navigation method provided in embodiments of this application.

The navigation method provided in embodiments of this application is first described herein from the perspective of the server side. To compensate for a defect of low precision of a path generated by using a conventional vector pathfinding algorithm, in this embodiment of this application, the conventional vector pathfinding algorithm is combined with a raster pathfinding algorithm, that is, a backbone path is planned by using the vector pathfinding algorithm, and a path between the backbone path and a start location and a path between the backbone path and an end location are planned by using the raster pathfinding algorithm, so that a path with higher precision can be generated.

The following describes an application scenario in embodiments of this application.

It may be understood that, if both the start location and the end location are located on a road that already exists in a map, a navigation requirement of a user can be met only by relying on a vector pathfinding algorithm. Therefore, the navigation method provided in this embodiment of this application is mainly applied to vehicle navigation, walk navigation, and the like in a complex scenario, that is, at least one of the start location and the end location is not located on a road that already exists in the map, where walk navigation may be augmented reality (Reality, AR) walk navigation.

Figure 2:
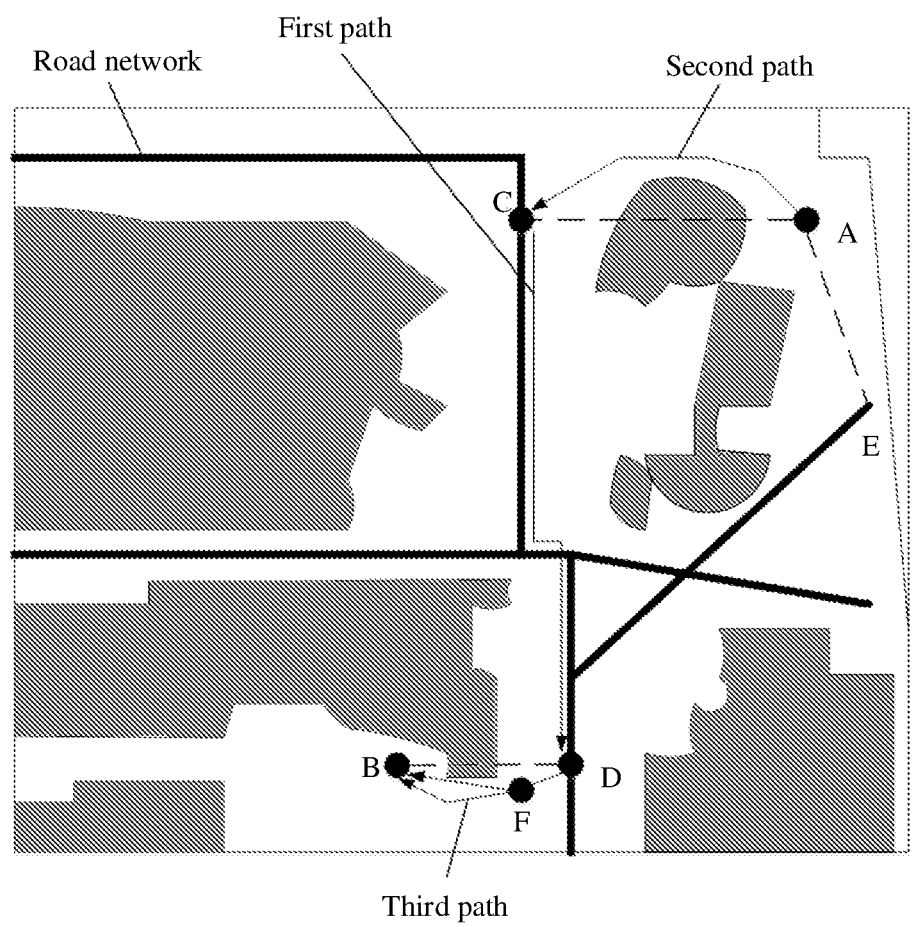
FIG. 2 is a schematic diagram of a region according to an embodiment of this application.

When the navigation method provided in this embodiment of this application is applied to vehicle navigation or common walk navigation, the navigation method may be specifically applied to a region in which road network data is sparse. A road network is a road system that includes various roads (the road includes a road segment and an intersection) in a specific region and that is interconnected and interleaved into mesh distribution. Correspondingly, the road network data is data of the road system, and may specifically include three-dimensional data of each location on the road segment. FIG. 2 is used as an example. A point A represents a start location, a point B represents an end location, and a thick solid line represents a road network. Based on this, it can be learned that there is no road network at both the start location and the end location. When a path planned by using a current navigation method usually includes only some road segments of the road network in FIG. 2, instead of a path from the start location A to the end location B, if the navigation method provided in this embodiment of this application is used, the path from the start location A to the end location B may be planned.

When the navigation method provided in this embodiment of this application is applied to AR walk navigation, this embodiment of this application may be specifically applied to indoor navigation, integrated indoor and outdoor navigation, cross-floor navigation, multi-obstacle region navigation, scenic spot navigation, parking lot navigation, and business circle navigation with complex terrain. For example, the navigation method provided in this embodiment of this application is used to search a parking lot for a vehicle; the navigation method provided in this embodiment of this application is used to search a pedestrian street in a business circle for a shop; and the navigation method provided in this embodiment of this application is used to search a shopping mall for a shop.

For example, a shopping mall is searched for a shop. A start location of a user is at home, and an end location of the user is a shop in the shopping mall. In a current navigation method, only a path from a road near the home to a road outside the shopping mall can be planned, but a path from the home to a road and a path from the outside of the shopping mall to the shop in the shopping mall cannot be planned. In the navigation method provided in this embodiment of this application, a path from the home of the user to the shop in the shopping mall can be planned.

It may be understood that when the navigation method provided in this embodiment of this application is applied to AR walk navigation, a terminal device needs to support an AR application. Specifically, the user may see a real world and a virtual world by using the terminal device, and the user may interact with the terminal device by touching a screen, performing a gesture, or the like.

Figure 3:
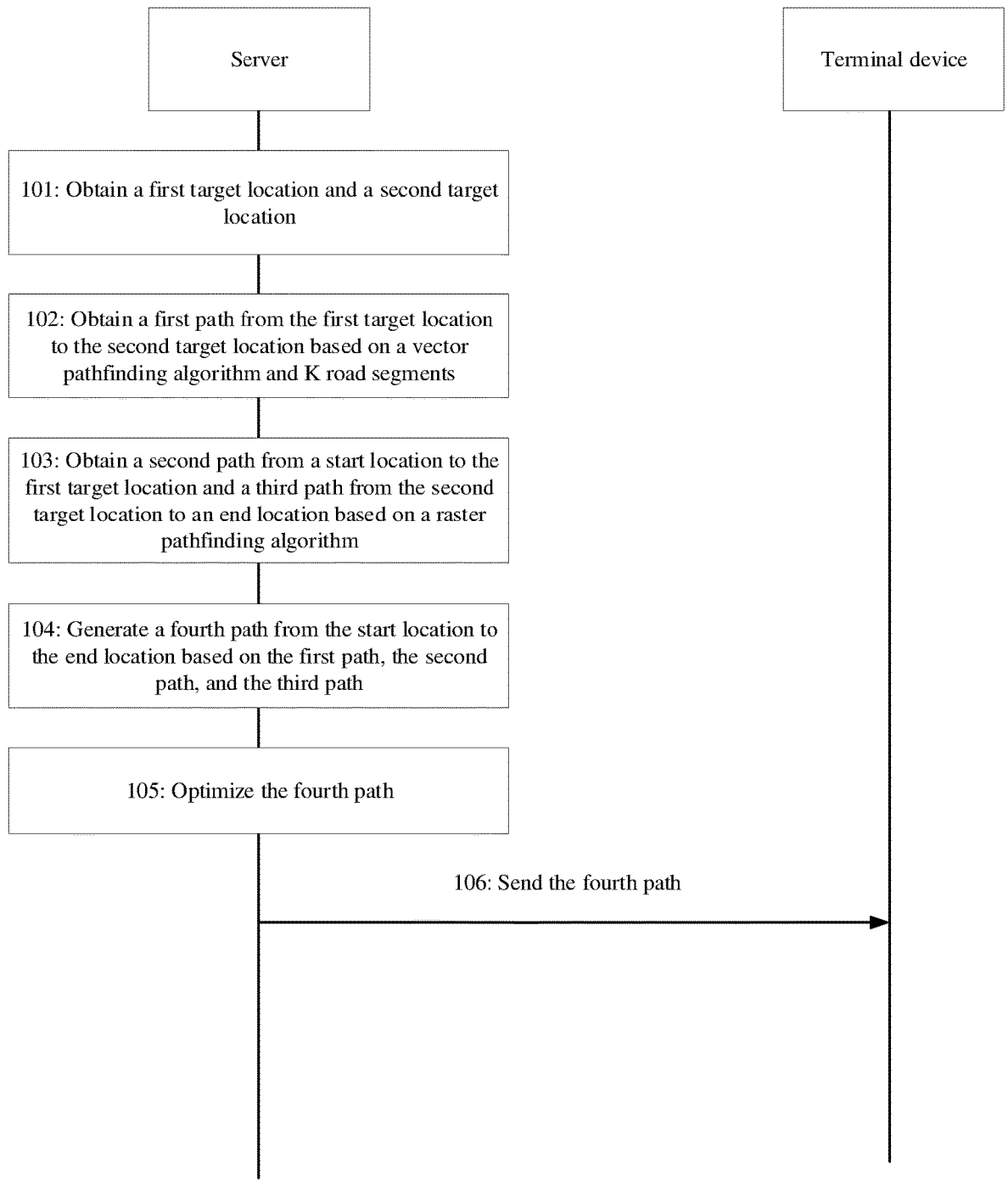
FIG. 3 is a schematic diagram of an embodiment of a navigation method according to an embodiment of this application.

The following specifically describes the navigation method provided in embodiments of this application. An AR walk navigation scenario in a walk navigation scenario is mainly used as an example for description below. As shown in FIG. 3, an embodiment of this application provides an embodiment of a navigation method. This embodiment may be applied to a server, or may be applied to a terminal device having a path planning function. The following describes the navigation method by using a server as an example.

First, the server stores three-dimensional road network data and walkable region data.

It can be learned from the foregoing descriptions that a road network is a road system that includes various roads (the road includes a road segment and an intersection) in a specific region and that is interconnected and interleaved into mesh distribution. For example, the road network may include road segments such as an ordinary road, a straight ladder, a stairway, a crosswalk, and an overpass. In addition, in this embodiment of this application, the road network may further include some indoor road segments, for example, include a main road segment in a large shopping mall. The three-dimensional road network data includes three-dimensional data of each location on a road segment.

The walkable region is a region in which walking or driving can be performed. It may be understood that, walkable regions are different for different objects. For example, for a vehicle, a carriageway is a walkable region and a sidewalk is a non-walkable region. For people, a walkable region may include regions such as a square, a pedestrian passage, a crosswalk, an overpass, and an indoor road, and a non-walkable region may include regions such as a carriageway, a lawn, and a ditch. Correspondingly, the walkable region data includes a range of the walkable region, height data of each location in the walkable region, and the like.

It should be noted that the three-dimensional road network data and the walkable region data are generated in a plurality of methods. This is not specifically limited in this embodiment of this application. For example, the three-dimensional road network data and the walkable region data may be generated based on point cloud data, road segment data, a non-textured model, a plan view, and the like.

Figure 4:
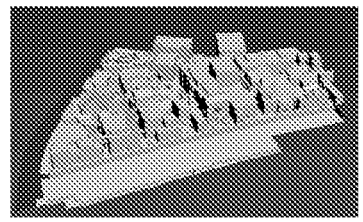
FIG. 4 is a schematic diagram of an embodiment of a non-textured model according to an embodiment of this application.
Figure 5:
FIG. 5 is a schematic diagram of an embodiment of a walkable region according to an embodiment of this application.

For ease of understanding, the following distinguishes between the non-textured model, the walkable region, and the three-dimensional road network in FIG. 4 to FIG. 5. FIG. 4 shows a non-textured model corresponding to a specific region. FIG. 5 shows a walkable region generated based on the non-textured model in FIG. 4. In FIG. 5, a white region represents a walkable region. It should be noted that FIG. 4 to FIG. 5 are only intended to distinguish between the non-textured model, the walkable region, and the three-dimensional road network, but are not intended to indicate a specific road segment or a specific region.

Specifically, the navigation method provided in this embodiment of this application includes the following steps.

Step 101: Obtain a first target location and a second target location, where the first target location is a location closest to a start location on K road segments, the second target location is a location closest to an end location on the K road segments, and K is a positive integer.

It may be understood that, before performing step 101, a server may first obtain a start location and an end location that are entered by a user.

It can be learned from the foregoing descriptions that three-dimensional road network data includes data of a plurality of road segments in a region. In this embodiment of this application, the three-dimensional road network data includes data of the K road segments, the K road segments are preset, and K may be adjusted based on an actual requirement.

The first target location and the second target location are obtained in a plurality of methods. This is not specifically limited in this embodiment of this application. A method for obtaining the first target location may be the same as a method for obtaining the second target location. Therefore, the following describes, by using the first target location as an example, the method for obtaining the first target location.

In an implementation, in three-dimensional space, a vertical line may be made from the start location to each of the K road segments, an intersection point of the vertical line and each of the K road segments is obtained, and then a distance between the intersection point and the start location is obtained. If there is no intersection point of the vertical line and the road segment, but there is an intersection point of the vertical line and an extension line of the road segment, a distance between the start location and a closest end point of the road segment can be obtained. Finally, the first target location may be determined by comparing the distance between the start location and the intersection point and the distance between the start location and the end point of the road segment. Another method for determining the first target location is described below with reference to FIG. 6 to FIG. 10.

Figure 6:
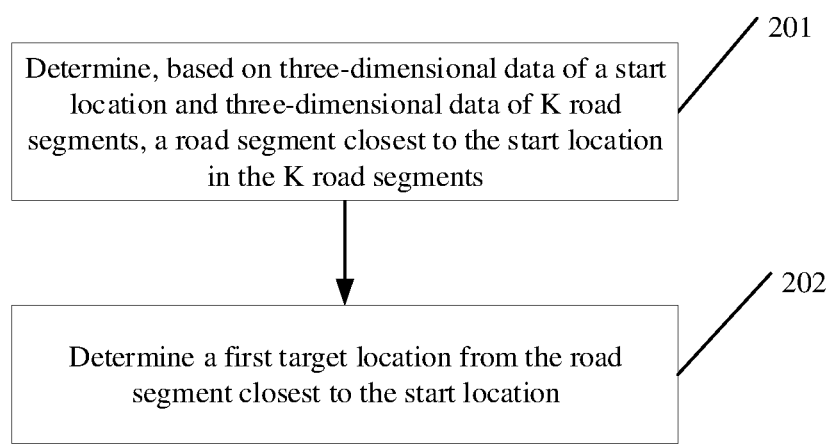
FIG. 6 is a schematic diagram of an embodiment of obtaining a first target location according to an embodiment of this application.

In another implementation, as shown in FIG. 6, the obtaining a first target location includes:

Step 201: Determine, based on three-dimensional data of a start location and three-dimensional data of K road segments, a road segment closest to the start location on the K road segments.

The three-dimensional data is mainly three-dimensional coordinates. The three-dimensional data of the start location is three-dimensional coordinates of the start location, and the three-dimensional data of the K road segments includes three-dimensional coordinates of each location on the K road segments.

It may be understood that there may be a height difference between the start location and the road segment, and height differences between the same start location and different road segments may be different. Therefore, in this embodiment of this application, the closest road segment is determined based on the three-dimensional data of the start location and the three-dimensional data of the K road segments, instead of two-dimensional data of the start location and two-dimensional data of the K road segments.

FIG. 2 is used as an example. A point A represents a start location, and the point A is located on the $10^{th}$ floor of a building. A point C represents a location on a road segment, and a point E represents a location on another road segment. The road segment on which the point C is located is located outside the exit of the $4^{th}$ floor of the building, and the road segment on which the point E is located is located outside the exit of the $1^{st}$ floor of the building. Although in FIG. 2, a distance between the point A and the point C is greater than a distance between the point A and the point E only from a two-dimensional perspective, that is, the road segment on which the point E is located is closer to the point A than the road segment on which the point C is located, after height differences between the point A and the two road segments are considered, the road segment on which the point C is located is actually closer to the point A than the road segment on which the point E is located.

It should be noted that the road segment closest to the start location on the K road segments is determined based on the three-dimensional data of the start location and the three-dimensional data of the K road segments in a plurality of methods. This is not limited in this embodiment of this application. Two of the methods are described below.

Figure 7:
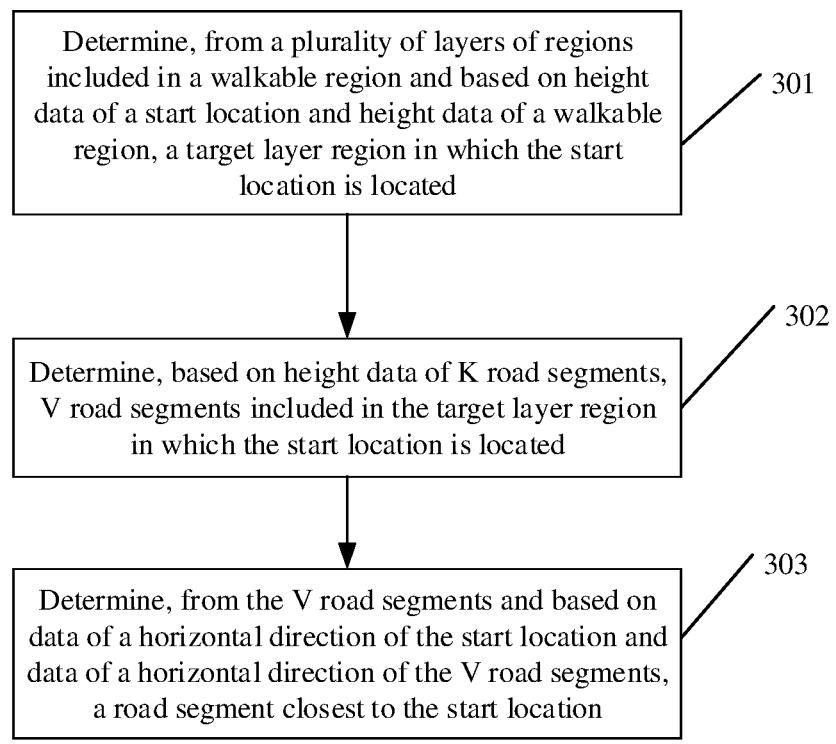
FIG. 7 is a schematic diagram of an embodiment of determining a road segment closest to a start location according to an embodiment of this application.

In an implementation, as shown in FIG. 7, the determining, based on three-dimensional data of the start location and three-dimensional data of K road segments, a road segment closest to the start location on the K road segments includes:

Step 301: Determine, from a plurality of layers of regions included in a walkable region and based on height data of the start location and height data of the walkable region, a target layer region in which the start location is located, where the target layer region is one of the plurality of layers of regions.

It can be learned from the foregoing descriptions that both road network data and walkable region data are three-dimensional data. Therefore, hierarchical management may be performed on the road network data and the walkable region data based on the height data in the three-dimensional data. Specifically, a road network of the entire region is divided into a plurality of layers of road networks, and correspondingly, the road network data is divided into data of the plurality of layers of road networks. The walkable region is divided into the plurality of layers of regions, and correspondingly, the walkable region data is divided into data of the plurality of layers of regions. The plurality of layers of road networks are in a one-to-one correspondence with the plurality of layers of regions.

Each layer of road network may not include a road segment, or may include at least one road segment.

For example, a building has 10 floors, a road network includes road segments of the 10 floors of the building, and a walkable region also includes regions of the 10 floors of the building. The walkable region may be divided into 10 layers of regions, and each floor is one layer of region. Correspondingly, the walkable region data includes region data of the 10 floors. The road network may be divided into 10 layers of road networks, and a road network in each floor is one layer of road network. Correspondingly, the road network data includes road network data of the 10 floors.

Based on a fact that the walkable region includes the plurality of layers of regions, the target layer region in which the start location is located may be determined based on the height data of the start location and the height data of the walkable region.

Step 302: Determine, based on height data of the K road segments, V road segments included in the target layer region in which the start location is located, where V is a positive integer less than or equal to K.

It can be learned from the foregoing descriptions that hierarchical management may be performed on the K road segments and the walkable region data based on the height data, and the plurality of layers of road networks are in a one-to-one correspondence with the plurality of layers of regions. Therefore, all road segments that are located in a same layer region as the start location may be determined based on the height data of the K road segments.

Step 303: Determine, from the V road segments and based on data of a horizontal direction of the start location and data of a horizontal direction of the V road segments, a road segment closest to the start location.

It may be understood that, because the V road segments and the start location are located in a same layer region, when the road segment closest to the start location is determined from the V road segments, a height difference between the road segment and the start location may be ignored.

FIG. 2 is used as an example. A point A represents a start location, and all road segments in FIG. 2 and the start location are located in a same layer area. A vertical line may be made from the point A to each road segment, and a distance between the point A and each vertical foot is used as a distance between the start location and each road segment. However, for some road segments, the vertical foot may be located on an extension line of a road segment. In this case, a distance between the start location and an end point of the road segment may be used as the distance between the start location and the road segment. A road segment on which a point E is located is used as an example. A distance between the point A and the point E is a distance between the road segment on which the point E is located and the start location. Finally, a road segment closest to the start location may be determined by comparing distances between the start location and road segments.

It can be learned from the foregoing descriptions that one layer of region may not include a road segment. Therefore, one layer of region in which the start location is located may not include any road segment. In this case, it may be considered that the start location is out of a navigation range.

In this embodiment of this application, the target layer region in which the start location is located is determined by using the walkable region, and then the target layer region needs to be searched for the road segment closest to the start location, so that efficiency of determining the road segment closest to the start location can be improved.

In addition to the method in the foregoing embodiment, the road network data may also be directly used to determine the road segment closest to the start location. This is described in detail below.

Figure 8:
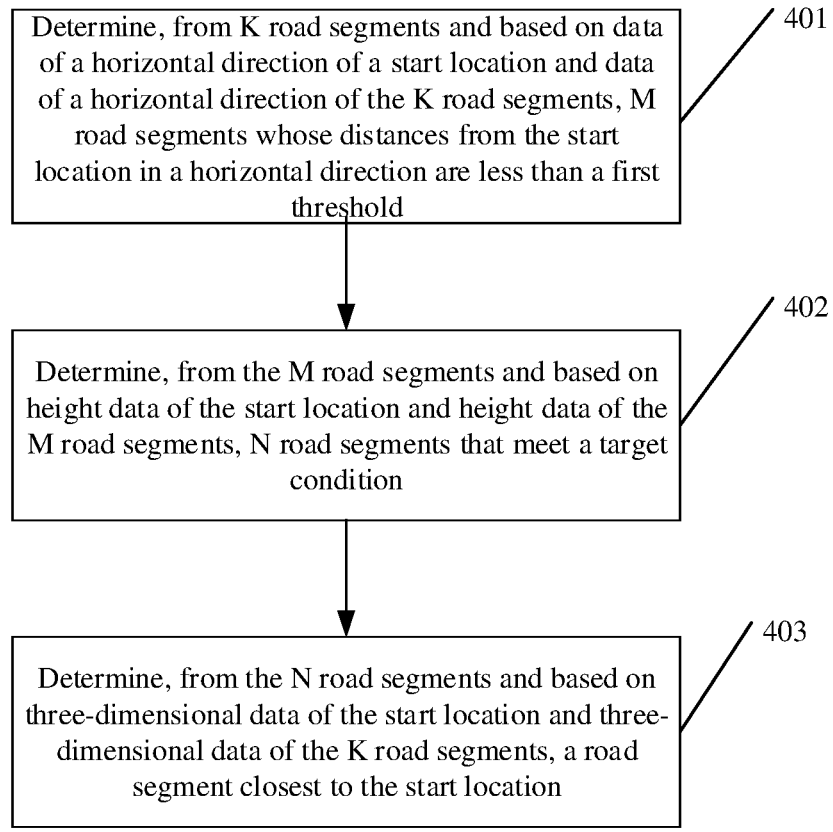
FIG. 8 is a schematic diagram of another embodiment of determining a road segment closest to a start location according to an embodiment of this application.

In another implementation, as shown in FIG. 8, the determining, based on three-dimensional data of the start location and three-dimensional data of K road segments, a road segment closest to the start location on the K road segments includes:

Step 401: Determine, from the K road segments and based on the data of the horizontal direction of the start location and the data of the horizontal direction of the K road segments, M road segments whose distances from the start location in a horizontal direction are less than a first threshold, where M is a positive integer less than or equal to K.

Determining the M road segments whose distances from the start location in the horizontal direction are less than the first threshold may be understood as: ignoring a height difference between the start location and the road segment, considering that the start location and the K road segments are in a same plane, then calculating distances between the start location and the K road segments, and finally selecting the M road segments whose distances from the start location are less than the first threshold.

The first threshold may be adjusted based on an actual requirement. This is not specifically limited in this embodiment of this application.

It may be understood that in this embodiment of this application, the M road segments are screened in the horizontal direction in step 401. For example, the K road segments are located in two adjacent buildings, and the start location is in one of the buildings. In step 401, the M road segments that are located in a same building as the start location may be determined, and a road segment in the other building is excluded.

Step 402: Determine, from the M road segments and based on the height data of the start location and height data of the M road segments, N road segments that meet a target condition, where N is a positive integer less than or equal to M.

In this embodiment of this application, the M road segments are further screened from a height in step 402, to obtain the N road segments that meet the target condition. The target condition may be set based on an actual requirement. This is not specifically limited in this embodiment of this application.

For example, the target condition includes: a value of height data of a road segment is greater than a difference between a value of the height data of the start location and a third threshold, and is less than a sum of the value of the height data of the start location and a second threshold.

The second threshold and the third threshold may be set based on an actual requirement.

Figure 9:
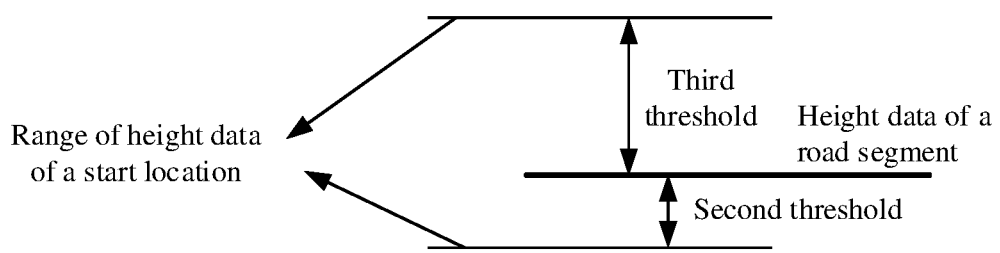
FIG. 9 is a schematic diagram of an embodiment of a relationship between a value of height data of a road segment and a value of height data of a start location according to an embodiment of this application.

It may be understood that a value of the height data of the start location is usually greater than a specific range of a surface of the road segment, and the range may be represented as (xx, yy); and the height data of the start location is usually from the terminal device. Therefore, there is a specific deviation in the height data of the start location. In this way, the range may be modified to (xx−ff, yy+ff), where ff represents the deviation, and the deviation ff is usually greater than xx. Based on this, as shown in FIG. 9, it may be considered that a value of the height data of the start location is greater than a difference between a value of height data of a road segment and a second threshold, and is less than a sum of the value of the height data of the road segment and a third threshold, where the second threshold is less than the third threshold. Correspondingly, the value of the height data of the road segment is greater than a difference between the value of the height data of the start location and the third threshold, and is less than a sum of the value of the height data of the start location and the second threshold.

For example, if the value of the height data of the start location is greater than a range (0.5 m, 1.5 m) of a road segment surface, and a deviation ff is 1 m, the foregoing range may be corrected to (−0.5 m, +2.5 m). Therefore, it may be considered that the value of the height data of the start location is greater than a difference between the value of the height data of the road segment and 0.5 m, and is less than a sum of the value of the height data of the road segment and 2.5 m. Correspondingly, the value of the height data of the road segment is greater than a difference between the value of the height data of the start location and 2.5 m, and is less than a sum of the value of the height data of the start location and 0.5 m.

Figure 10:
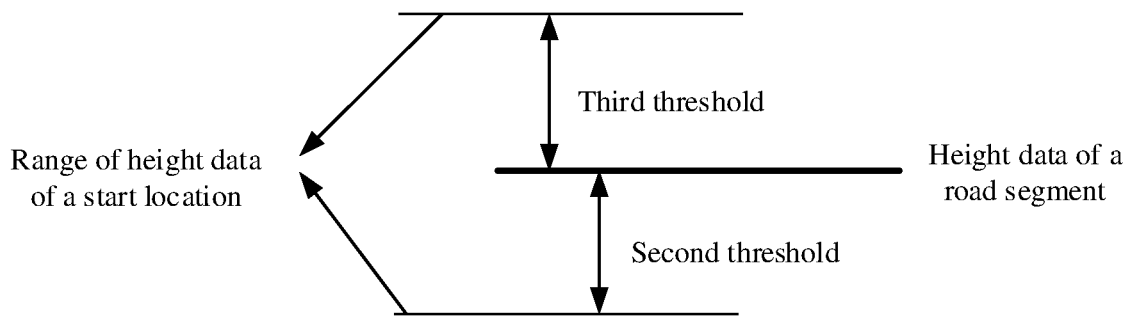
FIG. 10 is a schematic diagram of another embodiment of a relationship between a value of height data of a road segment and a value of height data of a start location according to an embodiment of this application.

However, for different terminal devices, accuracy of height data of start locations is different. Therefore, when accuracy of the height data of the start locations is high, the second threshold is less than the third threshold. When accuracy of the height data of the start locations is low, a value range of the height data of the road segment may be appropriately expanded. As shown in FIG. 10, a value of the height data of the start location is greater than a difference between a value of height data of a road segment and a second threshold, and is less than a sum of the value of the height data of the road segment and a third threshold, where the second threshold is equal to the third threshold. Correspondingly, the value of the height data of the road segment is greater than a difference between the value of the height data of the start location and the third threshold, and is less than a sum of the value of the height data of the start location and the second threshold, where the second threshold is equal to the third threshold.

Step 403: Determine, from the N road segments and based on the three-dimensional data of the start location and the three-dimensional data of the K road segments, the road segment closest to the start location.

It may be understood that, based on step 201 and step 402, the K road segments are separately screened from a horizontal direction and a height, to obtain the N road segments.

When distances between the N road segments and the start location are calculated, the height difference between the start location and the road segment may be considered, or the height difference between the start location and the road segment may not be considered. When the height difference between the start location and the road segment is considered, a distance between the start location and each of the N road segments may be calculated based on the three-dimensional data of the start location and the three-dimensional data of the K road segments. When the height difference between the start location and the road segment is not considered, a distance between the start location and each of the N road segments may be calculated based on two-dimensional data of a horizontal direction of the start location and two-dimensional data of a horizontal direction of the K road segments.

It should be noted that, if no road segment that meets the target condition is obtained after screening in step 401 and step 402, that is, N is 0, it may be considered that the start location is out of a navigation range.

In this embodiment of this application, the K road segments are separately screened from a horizontal direction and a height, to avoid a case in which the determined road segment closest to the start location is inaccurate because a road segment is close to the start location in the horizontal direction or the height.

For example, the start location is on the $5^{th}$ floor of Building A, one road segment is on the $4^{th}$ floor of Building A, the other road segment is on the $5^{th}$ floor of Building B, and a distance between Building A and Building B is short. In this case, because a height difference between the road segment located on the $5^{th}$ floor of Building B and the start location is 0, if distances between the start location and the two road segments in three-dimensional space are directly calculated, an obtained result may be that the road segment located on the $5^{th}$ floor of Building B is closer to the start location. However, it is clear that using the road segment located on the $5^{th}$ floor of Building B as the road segment closest to the start location is improper.

In this embodiment of this application, the K road segments are first screened in the horizontal direction by using the data of the horizontal direction of the start location and the data of the horizontal direction of the K road segments, to obtain the M road segments; then the M road segments are screened by using the height data of the start location and the height data of the M road segments, to obtain the N road segments; and finally the road segment closest to the start location is selected from the N road segments, to avoid the foregoing situation. In addition, in this embodiment of this application, a selection range of a road segment is first narrowed from a horizontal direction and a height, so that efficiency of determining a road segment closest to a start location can be improved.

The foregoing describes two methods for determining the road segment closest to the start location on the K road segments. One of the methods may be used to determine the road segment closest to the start location, or the two methods may be combined to determine the road segment closest to the start location.

For example, because the three-dimensional road network data is more comprehensive than the walkable region data, step 301 may be first performed; and if there is a road segment in the target layer region, step 302 and step 303 continue to be performed, or if there is no road segment in the target layer region, step 401 to step 403 are then performed to search for a road segment closest to the start location, so as to avoid a case in which the road segment closest to the start location cannot be found due to incomplete data of the walkable region.

Step 202: Determine the first target location from the road segment closest to the start location.

It can be learned from the foregoing descriptions that the first target location is determined from the road segment closest to the start location in a plurality of methods. This is not specifically limited in this embodiment of this application. For example, distances between the start location and locations on the road segment closest to the start location may be calculated, and then the first target location may be determined by comparing the distances. For example, the first target location may alternatively be determined by making a vertical line.

In this embodiment of this application, compared with determining a first target location without considering height data, determining, based on the three-dimensional data of the start location and the three-dimensional data of the K road segments, the road segment closest to the start location on the K road segments, and then determining the first target location from the road segment closest to the start location can avoid a "dramatic height deviation" error guidance caused because a large height difference exists on a path planned based on the first target location.

Step 102: Obtain a first path from the first target location to the second target location based on a vector pathfinding algorithm and the K road segments.

Because both the first target location and the second target location are on a road segment in the K road segments, the first path from the first target location to the second target location may be planned based on the K road segments and the vector pathfinding algorithm. Because the vector pathfinding algorithm is a mature technology, details are not described herein.

FIG. 2 is used as an example. A point C represents a first target location, and a point D represents a second target location. A first path shown in FIG. 2 may be planned by using a vector pathfinding algorithm.

Step 103: Obtain a second path from the start location to the first target location and a third path from the second target location to the end location based on a raster pathfinding algorithm.

The raster pathfinding algorithm includes but is not limited to an A* algorithm, a Dijkstra algorithm, and a JPS algorithm.

It should be noted that processes of planning the second path and the third path by using the raster pathfinding algorithm are the same. The following describes, by using the second path as an example, a method for obtaining the second path based on the raster pathfinding algorithm.

Figure 11:
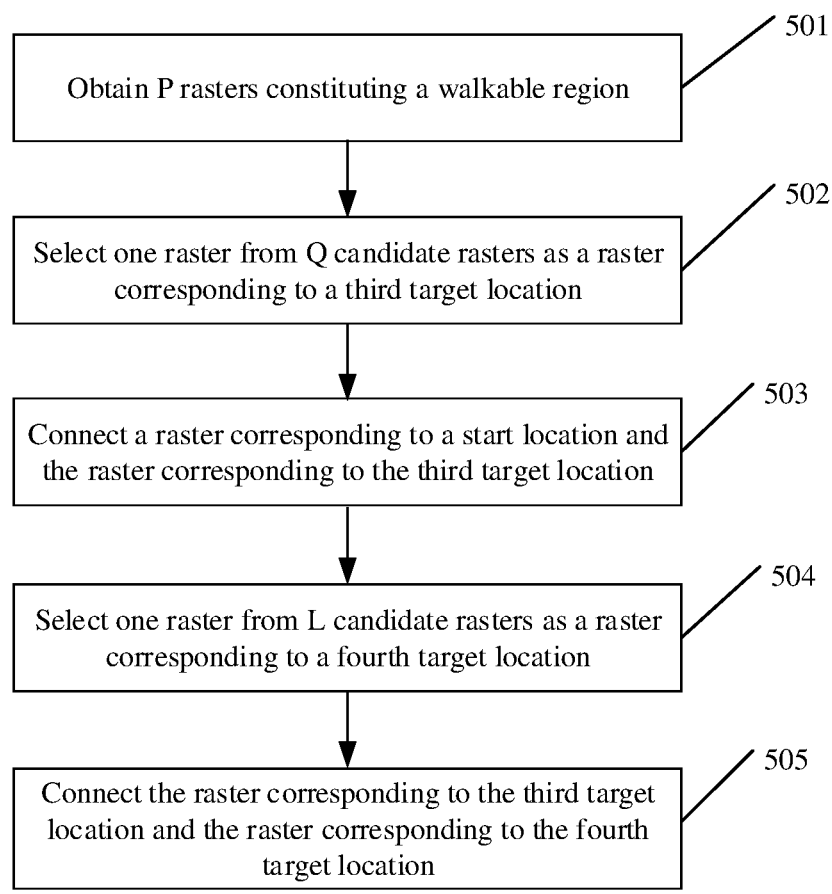
FIG. 11 is a schematic diagram of an embodiment of obtaining a second path according to an embodiment of this application.

In an implementation, as shown in FIG. 11, an A* algorithm in the existing raster pathfinding algorithm is used as an example, and the obtaining a second path from the start location to the first target location based on a raster pathfinding algorithm may include:

Step 501: Obtain P rasters constituting a walkable region, where the P rasters include a raster corresponding to the start location and a raster corresponding to the end location, and P is a positive integer greater than 2.

The obtaining P rasters may include: dividing the walkable region into the P rasters, where a size of the raster may be set based on an actual requirement.

It may be understood that the walkable region is usually stored in a form of an image, and therefore each pixel may be used as a raster.

Figure 12:
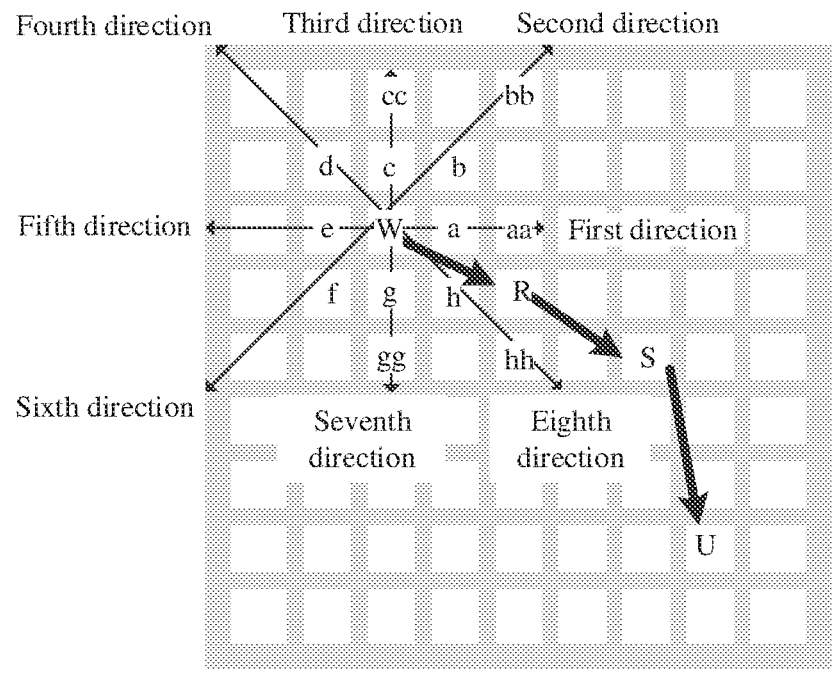
FIG. 12 is a schematic diagram of an embodiment of a walkable region including a raster according to an embodiment of this application.

FIG. 12 shows an example of a walkable region including rasters.

The obtaining a second path from the start location to the first target location based on a raster pathfinding algorithm includes:

Step 502: Select one raster from Q candidate rasters as a raster corresponding to a third target location, where the Q candidate rasters belong to the P rasters, and Q is a positive integer less than P.

It may be understood that, before step 502 is performed, the Q candidate rasters may be first selected from the P rasters according to a selection rule. Specifically, the Q candidate rasters may be selected, according to the selection rule, around a raster corresponding to the start location. Then, costs generated when the second path passes through each of the Q candidate rasters are calculated, and then a raster with a minimum cost is used as a raster corresponding to a next location of the start location. In this embodiment of this application, the next location of the start location is referred to as the third target location.

It should be noted that calculating the costs generated when the second path passes through each of the Q candidate rasters is a mature technology. Therefore, details are not described herein.

The selection rule may be set based on an actual requirement. This is not specifically limited in this embodiment of this application.

For example, as shown in FIG. 12, a raster W is a raster corresponding to a start location. In an A* algorithm, eight candidate rasters a, b, c, d, e, f, g, and h are selected in the raster W respectively along a first direction to an eighth direction in FIG. 12 by using the raster W as a reference. To further increase a quantity of candidate rasters, a selection range may continue to be expanded, and selection is still performed along the first direction to the eighth direction. In this case, eight additional candidate rasters aa, bb, cc, dd, ee, ff, gg, and hh are selected.

It can be learned from FIG. 12 that a raster that is not selected as a candidate raster exists between the raster aa and the raster hh. It may be understood that, as the selection range continuously expands, candidate rasters can be selected only from the first direction to the eighth direction according to the foregoing selection method, and rasters in other directions are not selected as candidate rasters.

To select the candidate raster in more directions, in another implementation, the selection rule includes coordinates of a first horizontal direction of the candidate raster and coordinates of a second horizontal direction of the candidate raster, where the first horizontal direction is perpendicular to the second horizontal direction, and the first horizontal direction and the second horizontal direction may be understood as a horizontal coordinate direction and a vertical coordinate direction in a two-dimensional coordinate system.

The coordinates of the first horizontal direction of the candidate raster are equal to a sum of coordinates of a first horizontal direction of the raster corresponding to the start location and a first offset, the first offset is equal to a product of a first step and a cosine value of a first angle, the first step is equal to a sum of an initial step and a first step increment, the step increment is equal to a product of a first quantity of accumulation times and a step increment accumulated each time, the first angle is equal to a sum of an initial angle and a first angle increment, and the first angle increment is equal to a product of a second quantity of accumulation times and an angle increment accumulated each time.

The coordinates of the second horizontal direction of the candidate raster are equal to a sum of coordinates of a second horizontal direction of the raster corresponding to the start location and a second offset, and the second offset is equal to a product of the first step and a sine value of the first angle.

The foregoing candidate rule may be represented by using Formula n·x=x+(rasterDist+rasterStep*n)*cos((startAngle+dltAngle*m)*PI/180) and Formula n·y=y+(rasterDist+rasterStep*n)*sin((startAngle+dltAngle*m)*PI/180), where n·x represents the coordinates of the first horizontal direction of the candidate raster, x represents the coordinates of the first horizontal direction of the raster corresponding to the start location, rasterDist represents the initial step, rasterStep represents the step increment accumulated each time, n represents the first quantity of accumulation times, n·y represents the coordinates of the second horizontal direction of the candidate raster, and y represents the coordinates of the second horizontal direction of the raster corresponding to the start location.

Figure 13:
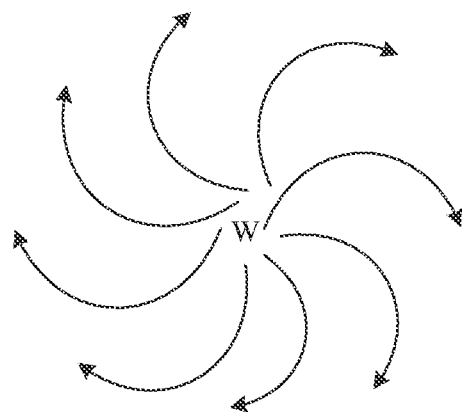
FIG. 13 is a schematic diagram of an embodiment of a selection direction of a candidate raster according to an embodiment of this application.

According to the foregoing selection rule, a selection direction of the candidate raster may be flexibly adjusted, to select a candidate raster from each direction, so that the finally determined third target location is more proper. For example, according to the foregoing selection rule, candidate rasters may be selected along eight directions in FIG. 13.

Step 503: Connect the raster corresponding to the start location and the raster corresponding to the third target location.

It may be understood that a track from the raster corresponding to the start location to the raster corresponding to the third target location can be obtained by connecting the raster corresponding to the start location and the raster corresponding to the third target location, and the track represents a subpath from the start location to the third target location.

Step 504: Select one candidate raster from L candidate rasters as a raster corresponding to a fourth target location, where the L candidate rasters belong to the P rasters, and L is a positive integer less than P.

It should be noted that, before step 504 is performed, the L candidate rasters may be first selected. A method for selecting the L candidate rasters may be the same as a method for selecting the Q candidate rasters. For details, refer to related descriptions in step 502 for understanding.

A method for selecting the L candidate rasters may also be different from a method for selecting the Q candidate rasters. For example, the L candidate rasters are selected from rasters other than the Q candidate rasters and at least one raster that meets a target location relationship with the Q candidate rasters. In this way, the L candidate rasters do not include the Q candidate rasters and the at least one raster that meets the target location relationship with the Q candidate rasters.

It may be understood that, in step 502, costs of the Q candidate rasters have been calculated, and one raster is finally selected from the Q candidate rasters as the raster corresponding to the third target location. In this case, the Q candidate rasters do not become the raster corresponding to the fourth target location. Therefore, the L rasters may be selected from rasters other than the Q candidate rasters.

In addition, a size of the raster is usually small. Therefore, a quantity of rasters in the walkable region is usually large. For example, when a pixel is a raster, an image of a walkable region includes many pixels. Therefore, to traverse the P rasters as much as possible, a long traversal time is required.

Therefore, in this embodiment of this application, if one candidate raster is traversed, it is considered that a plurality of rasters around the candidate raster are traversed. Therefore, the L candidate rasters may be selected from rasters other than the Q candidate rasters and at least one raster around the Q candidate rasters.

The raster around the Q candidate rasters may be determined based on a target location relationship. The target location relationship may be set based on an actual requirement. This is not specifically limited in this embodiment of this application.

In this embodiment of this application, because the L candidate rasters neither include the Q candidate rasters, nor include the at least one raster that meets the target location relationship with the Q candidate rasters, repeated screening of the Q candidate rasters is avoided, and efficiency of traversing the P rasters can be improved, to improve efficiency of obtaining the second path, and reduce time for obtaining the second path.

A method for selecting the raster corresponding to the fourth target location is the same as a method for selecting the raster corresponding to the third target location. For details, refer to related descriptions in step 502 for understanding.

Step 505: Connect the raster corresponding to the third target location and the raster corresponding to the fourth target location.

Similarly, a track from the raster corresponding to the third target location to the raster corresponding to the fourth target location can be obtained by connecting the raster corresponding to the third target location and the raster corresponding to the fourth target location, and the track represents a subpath from the third target location to the fourth target location.

The foregoing steps are repeated until a raster corresponding to the first target location is connected, to obtain the second path from the start location to the first target location.

FIG. 12 is used as an example. A raster W represents a raster corresponding to a start location, a raster R represents a raster corresponding to a third target location, a raster S represents a raster corresponding to a fourth target location, and a raster U represents a raster corresponding to an end location. If the foregoing raster pathfinding method is used, a track that sequentially passes through the raster W, the raster R, the raster S, and the raster U shown in FIG. 12 is finally obtained, and the track represents a path from the start location to the end location.

The second path and the third path may be planned by using the foregoing raster pathfinding method. For example, the second path and the third path may be separately shown in FIG. 2.

In addition, it should be noted that the foregoing raster pathfinding algorithm is mainly applicable to planning of the first path when an obstacle exists between the start location and the first target location. When no obstacle exists between the start location and the first target location, the foregoing raster pathfinding algorithm may also be used. To improve planning efficiency of the first path, the first target location may be further directly connected to the start location.

Step 104: Generate a fourth path from the start location to the end location based on the first path, the second path, and the third path, where the fourth path is for navigation.

It may be understood that the first path, the second path, and the third path may be spliced to generate the fourth path from the start location to the end location, and then navigation is performed based on the fourth path. In a splicing process, some redundant and repeated paths may be removed. Specifically, some redundant and repeated paths may be removed through vector track encryption and linear traversal.

Step 105: Optimize the fourth path.

After the fourth path is obtained, the fourth path may be directly for navigation. In addition, to make the fourth path more accurate and faster, the fourth path may also be optimized before navigation. Therefore, step 105 is optional.

A length of the fourth path may be shortened through optimization, so that a user can reach the end location more quickly, to improve user experience.

It should be noted that the fourth path is optimized in a plurality of methods. This is not specifically limited in this embodiment of this application.

In an implementation, the optimizing the fourth path includes:

first determining an optimizable region in the walkable region.

It should be noted that, as shown in FIG. 2, a white region represents a walkable region, and a black region represents a non-walkable region. It can be learned from FIG. 2 that some walkable regions are long and narrow. If a path located in a long and narrow walkable region is optimized, a path obtained after the optimization is similar to a path existing before the optimization, that is, a length of the path cannot be significantly reduced, and therefore an optimization effect is not obvious.

Therefore, in this embodiment of this application, the optimizable region is determined from the walkable region, to avoid a case in which a long optimization time is consumed but a good optimization effect cannot be achieved. The optimizable region is determined in a plurality of methods. This is not specifically limited in this embodiment of this application. For example, in an image corresponding to the walkable region, a window of a specific size is continuously moved. When a ratio of an area of the walkable region located in the window to an area of the window reaches a preset value, the walkable region in the window is used as the optimizable region.

An algorithm for generating the optimizable region based on the walkable region includes but is not limited to a graphics algorithm such as image morphology and template matching, and another data processing method such as machine learning and deep learning.

After the optimizable region is determined, a part that is of the fourth path and that is located in the optimizable region is optimized.

The part that is of the fourth path and that is located in the optimizable region is optimized in a plurality of methods. This is not specifically limited in this embodiment of this application.

In an implementation, a fifth target location and a sixth target location exist on the fourth path, and both the fifth target location and the sixth target location are located in the optimizable region.

The optimizing the part that is of the fourth path and that is located in the optimizable region includes:
replacing a non-linear path with a linear path from the fifth target location to the sixth target location based on a fact that no obstacle exists between the fifth target location and the sixth target location and a part that is of the fourth path and that is located between the fifth target location and the sixth target location is the non-linear path, to optimize that fourth path.

The fifth target location and the sixth target location may be any two locations that are located on the fourth path and that are in the optimizable region. The non-linear path is opposite to the linear path, including but not limited to a curved path and a broken-line path.

It may be understood that it may be determined, based on the three-dimensional road network data, that no obstacle exists between the fifth target location and the sixth target location.

FIG. 2 is used as an example. A point B represents a sixth target location (that is, an end location), a point F represents a fifth target location, and both the point B and the point F are located in an optimizable region. It can be learned from FIG. 2 that no obstacle exists between the point B and the point F. Therefore, the point F and the point B may be directly connected. For details, refer to a dotted line from the point F to the point B in FIG. 2. In this way, a part that is of the fourth path and that is between the point F and the point B changes from a broken line from the point F to the point B to a straight line from the point F to the point B.

Based on this, it can be learned that, after optimization, a length of the fourth path becomes shorter. Therefore, the user can directly reach the sixth target location from the fifth target location by passing through a road segment represented by the dotted line from the point F to the point B, without passing through a broken-line road segment with a long distance, to save time of the user.

In addition, step 105 may further include: performing curve optimization on the fourth path by using a method such as Bessel curve optimization, so that the fourth path is smoother.

Step 106: Send the fourth path to the terminal device, so that the terminal device performs navigation based on the fourth path.

It may be understood that, because planning the fourth path needs to occupy a large quantity of resources, step 101 to step 105 are usually performed by the server. After performing step 105, the server may send the fourth path to the terminal device. In this way, the terminal device may perform navigation based on the fourth path, to guide the user to walk from the start location to the end location. Therefore, step 106 is optional.

In this embodiment of this application, the first path between the first target location and the second target location is planned by using the vector pathfinding algorithm, to improve planning efficiency of the fourth path from the start location to the end location; and in a region in which an obstacle exists or a region in which a path cannot be planned by using the vector pathfinding algorithm because a road network is sparse, the second path between the start location and the first target location and the third path between the end location and the second target location are planned by using the raster pathfinding algorithm, to improve accuracy and precision of the fourth path from the start location to the end location, so that the fourth path can well avoid an obstacle. Therefore, this embodiment of this application is better applicable to high-precision AR walk navigation.

Figure 14:
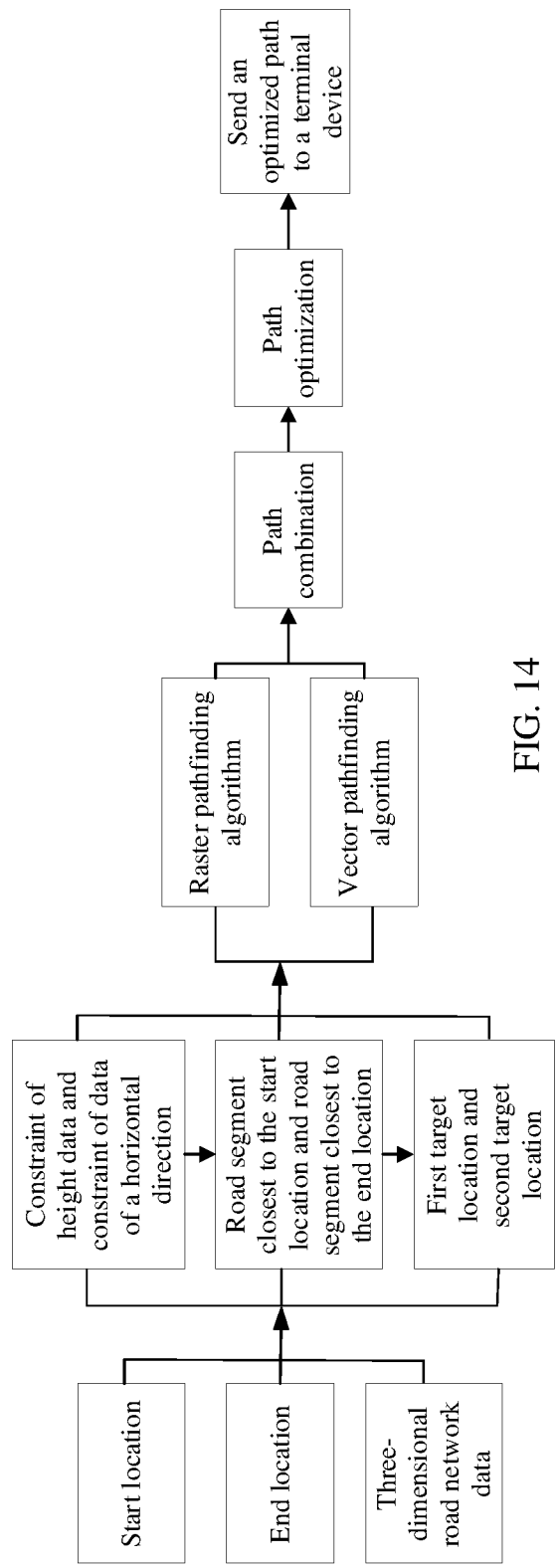
FIG. 14 is a schematic diagram of a process of planning a fourth path by using a navigation method according to an embodiment of this application.

Based on the foregoing descriptions, as shown in FIG. 14, a process of planning the fourth path by using the navigation method provided in this embodiment of this application may be summarized as follows:

A server receives a start location and an end location, and then determines a first target location and a second target location based on the start location, the end location, and three-dimensional road network data; in a process of determining the first target location and the second target location, selects, based on a constraint of height data and a constraint of data of a horizontal direction, a road segment closest to the start location and a road segment closest to the end location; then plans paths based on the first target location and the second target location by using a raster pathfinding algorithm and a vector pathfinding algorithm, combines the paths planned by using the raster pathfinding algorithm and the vector pathfinding algorithm, and then performs path optimization on a combined path; and finally, sends an optimized path to a terminal device.

Figure 15:
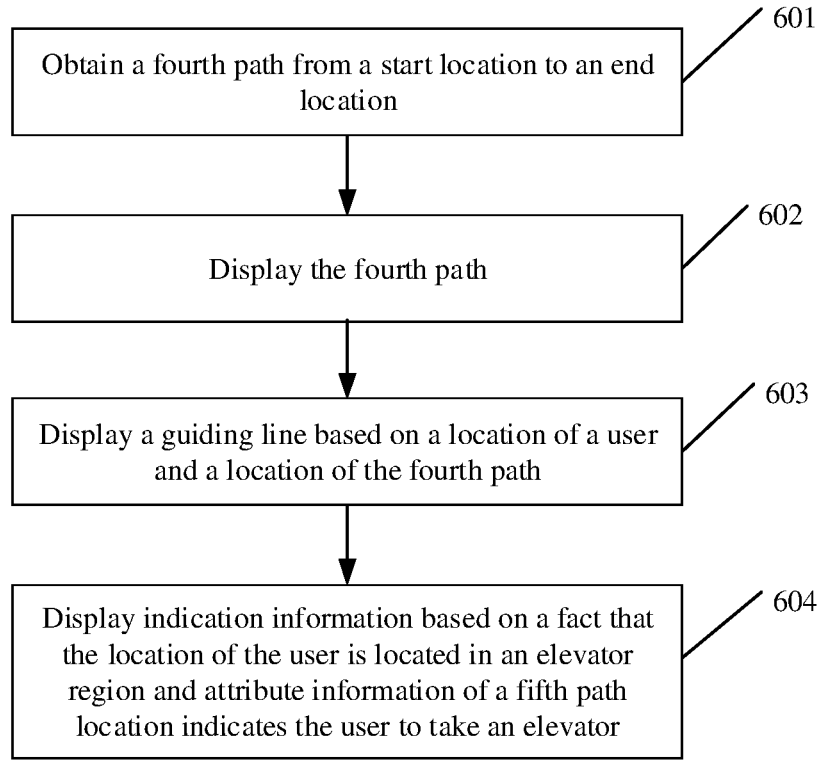
FIG. 15 is a schematic diagram of another embodiment of a navigation method according to an embodiment of this application.

The following describes, from a perspective of a terminal device, a navigation method provided in embodiments of this application. As shown in FIG. 15, an embodiment of this application provides an embodiment of a navigation method. The navigation method may be applied to a terminal device. This embodiment includes the following steps.

Step 601: Obtain a fourth path from a start location to an end location.

It should be noted that step 601 may include: The terminal device plans the fourth path by using the foregoing navigation method. In addition, step 601 may also include: The terminal device receives the fourth path sent by a server.

Step 602: Display the fourth path.

It may be understood that the terminal device displays the fourth path to indicate a user to move from the start location to a target location. A method for displaying the fourth path is a mature technology. This is not specifically limited in this embodiment of this application.

Step 603: Display a guiding line based on a location of a user and a location of the fourth path, where the guiding line indicates the user to move along the fourth path toward the end location.

The location of the user may be a real-time location of the user.

It should be noted that a location of the guiding line varies with a relative location between the location of the user and the location of the fourth path. For example, when the location of the user is on the fourth path, the location of the guiding line is on the fourth path, and a direction of the guiding line is the same as a direction of the fourth path.

When the location of the user is not on the fourth path, a corresponding guiding line needs to be displayed based on specific situations of the location of the user and the location of the fourth path. Descriptions are separately provided below in four cases.

In an implementation, the fourth path is formed by sequentially connecting a plurality of reference locations, and two adjacent reference locations are connected to form a subpath.

The plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location.

The displaying a guiding line based on a location of a user and a location of the fourth path includes:
  displaying the guiding line from the location of the user to the second reference location based on a fact that the location of the user and the third reference location are on a same side of the first subpath and the location of the user is between an angle bisector of the target angle and the first subpath.

Figure 16:
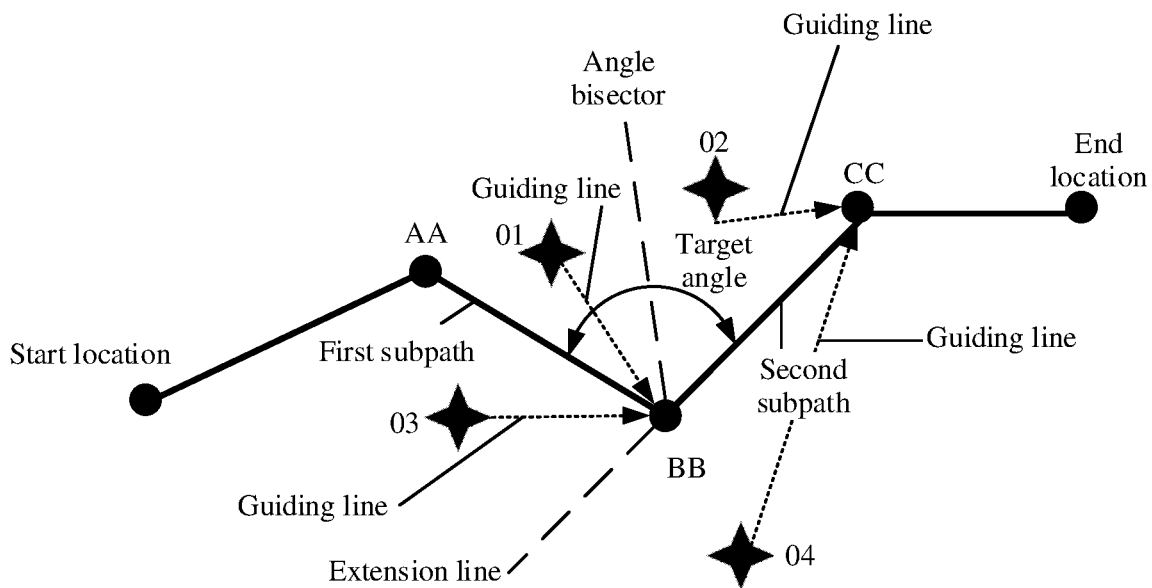
FIG. 16 is a schematic diagram of an embodiment of a fourth path according to an embodiment of this application.

FIG. 16 is used as an example. A fourth path includes a start location, a first reference location AA, a second reference location BB, a third reference location CC, and an end location that are sequentially connected. Based on this, the fourth path includes four subpaths. The first reference location AA and the second reference location BB are connected to form a first subpath, and the second reference location BB and the third reference location CC are connected to form a second subpath. The first subpath and the second subpath form a target angle whose vertex is the second reference location BB, and O1 represents a current location of a user. It can be learned from FIG. 16 that the current location O1 of the user and the third reference location CC are on a same side of the first subpath, and the current location O1 of the user is between an angle bisector of the target angle and the first subpath. Therefore, the guiding line points from the current location 01 of the user to the second reference location BB.

In the scenario in this implementation, the guiding line from the location of the user to the second reference location is displayed, so that the user can be accurately guided to move along the fourth path.

In another implementation, the fourth path is formed by sequentially connecting a plurality of reference locations, and two adjacent reference locations are connected to form a subpath.

The plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location.

The displaying a guiding line based on a location of a user and a location of the fourth path includes: displaying the guiding line from the location of the user to the third reference location based on a fact that the location of the user and the third reference location are on a same side of the first subpath and the location of the user is between an angle bisector of the target angle and the second subpath.

FIG. 16 is still used as an example. A fourth path includes a start location, a first reference location AA, a second reference location BB, a third reference location CC, and an end location that are sequentially connected. Based on this, the fourth path includes four subpaths. The first reference location AA and the second reference location BB are connected to form a first subpath, and the second reference location BB and the third reference location CC are connected to form a second subpath. The first subpath and the second subpath form a target angle whose vertex is the second reference location BB, and O2 represents a current location of a user. It can be learned from FIG. 16 that the current location 02 of the user and the third reference location CC are on a same side of the first subpath, and the current location 02 of the user is between an angle bisector of the target angle and the second subpath. Therefore, the guiding line points from the current location 02 of the user to the third reference location CC.

In the scenario in this implementation, the guiding line from the location of the user to the third reference location is displayed, so that the user can be accurately guided to move along the fourth path.

In another implementation, the fourth path is formed by sequentially connecting a plurality of reference locations, and two adjacent reference locations are connected to form a subpath.

The plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location. The first reference location may be the start location.

The displaying a guiding line based on a location of a user and a location of the fourth displaying the guiding line from the location of the user to the second reference location based on a fact that the location of the user and the third reference location are on both sides of the first subpath and the location of the user and the first reference location are on a same side of a reverse extension line of the second subpath.

FIG. 16 is still used as an example. A fourth path includes a start location, a first reference location AA, a second reference location BB, a third reference location CC, and an end location that are sequentially connected. Based on this, the fourth path includes four subpaths. The first reference location AA and the second reference location BB are connected to form a first subpath, and the second reference location BB and the third reference location CC are connected to form a second subpath. The first subpath and the second subpath form a target angle whose vertex is the second reference location BB, and O3 represents a current location of a user. It can be learned from FIG. 16 that the current location 03 of the user and the third reference location CC are on both sides of the first subpath, and the current location 03 of the user and the first reference location AA are on a same side of a reverse extension line of the second subpath. Therefore, the guiding line points from the current location 03 of the user to the second reference location BB.

In the scenario in this implementation, the guiding line from the location of the user to the second reference location is displayed, so that the user can be accurately guided to move along the fourth path.

In another implementation, the fourth path is formed by sequentially connecting a plurality of reference locations, and two adjacent reference locations are connected to form a subpath.

The plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location.

The displaying a guiding line based on a location of a user and a location of the fourth path includes:
    displaying the guiding line from the location of the user to the third reference location based on a fact that the location of the user and the third reference location are on both sides of the first subpath and the location of the user and the first reference location are on both sides of a reverse extension line of the second subpath.

FIG. 16 is still used as an example. A fourth path includes a start location, a first reference location AA, a second reference location BB, a third reference location CC, and an end location that are sequentially connected. Based on this, the fourth path includes four subpaths. The first reference location AA and the second reference location BB are connected to form a first subpath, and the second reference location BB and the third reference location CC are connected to form a second subpath. The first subpath and the second subpath form a target angle whose vertex is the second reference location BB, and O4 represents a current location of a user. It can be learned from FIG. 16 that the current location O4 of the user and the third reference location CC are on both sides of the first subpath, and the current location O4 of the user and the first reference location AA are on both sides of a reverse extension line of the second subpath. Therefore, the guiding line points from the current location O4 of the user to the third reference location CC.

In the scenario in this implementation, the guiding line from the location of the user to the third reference location is displayed, so that the user can be accurately guided to move along the fourth path.

In this embodiment of this application, the guiding line is displayed based on the location of the user and the location of the fourth path, so that the guiding line can be adjusted in a timely manner, and the user can be accurately guided to move along the fourth path.

It can be learned from the foregoing descriptions that the terminal device displays the guiding line when displaying the fourth path, and the guiding line is displayed in a plurality of methods. The location and the direction of the guiding line are described in the foregoing embodiments, and a height of the guiding line is described below.

In an implementation, the fourth path is formed by sequentially connecting a plurality of reference locations, a height of the guiding line at a fourth reference location is equal to a sum of a height of the fourth reference location and a specific height, and the fourth reference location is any one of the plurality of reference locations.

It may be understood that the guiding line may be located on the fourth path. Correspondingly, the height of the fourth reference location may be obtained, and then a specific height is added to the height of the fourth reference location, to obtain the height of the guiding line, and the guiding line at the fourth reference location is displayed based on the height of the guiding line. Specifically, a vertical line may be made from the fourth reference location to a non-textured model in a map to obtain an intersection point of the vertical line and the non-textured model, and then a height between the fourth reference location and the intersection point is calculated, to obtain the height of the fourth reference location.

The specific height may be set based on an actual requirement. For example, specific heights corresponding to all reference locations on the fourth path are the same.

Figure 17:
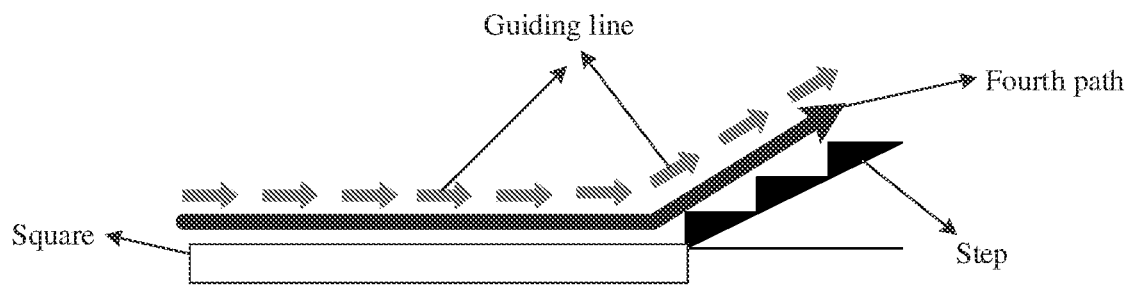
FIG. 17 is a schematic diagram of an embodiment of a guiding line according to an embodiment of this application.

FIG. 17 is used as an example. The fourth path sequentially passes through a square and a step. Correspondingly, a height of the fourth path at the step is higher than a height of the fourth path at the square. Because a height of the guiding line at any reference location is equal to a sum of a height of the reference location and a specific height, it can be learned from FIG. 17 that the height of the guiding line at the step is also higher than the height of the guiding line at the square.

In this embodiment of this application, because relative heights of the guiding line and a location of the guiding line are determined, a height change of the fourth path can be vividly presented to the user, to improve user experience.

It may be understood that in an actual navigation process, a navigation scenario is variable. For example, an elevator may be passed through in a process of performing navigation by using the fourth path. The following describes, by using an elevator scenario as an example, the navigation method provided in embodiments of this application.

In an implementation, the fourth path is formed by sequentially connecting a plurality of reference locations. The method further includes:

Step 604: Display indication information based on a fact that the location of the user is located in an elevator region and attribute information of a fifth reference location indicates the user to take the elevator, where the indication information indicates the user to take the elevator, and the fifth reference location is a reference location closest to the location of the user in the plurality of reference locations.

It may be understood that the terminal device may obtain the location of the user, and determine, based on the three-dimensional road network data, that the location of the user is located in the elevator region. In addition, the terminal device may obtain the reference location closest to the location of the user. In this embodiment of this application, the closest reference location is referred to as the fifth reference location.

Then, the terminal device may query preset attribute information of the fifth reference location. The attribute information may include a plurality of types of information. Content of the attribute information is not specifically limited in this embodiment of this application. For example, the attribute information may indicate that the user needs to take the elevator, or may indicate that the user does not need to take the elevator. When the attribute information indicates that the user needs to take the elevator, the attribute information may further indicate a target floor to be reached after the user takes the elevator.

After finding the attribute information of the fifth reference location, the terminal device may display indication information, where the indication information indicates the user to take the elevator, and the indication information may further indicate a target floor to be reached after the user takes the elevator. The indication information may be displayed in a plurality of manners. This is not specifically limited in this embodiment of this application. For example, the indication information may be displayed in a form of a prompt box.

In addition, after the target floor is reached, the terminal device may further obtain user operation information, and indicate, based on the operation information, that the user has reached the target floor. The terminal device may re-obtain a current location of the user, and send the current location of the user to the server, so that the server replans a path from the current location to the end location. Finally, the terminal device continues navigation based on the path replanned by the server.

In this embodiment of this application, the indication information is displayed to prompt the user to take the elevator, so that it can be ensured that the user accurately walks along the fourth path in a complex elevator scenario.

Figure 18:
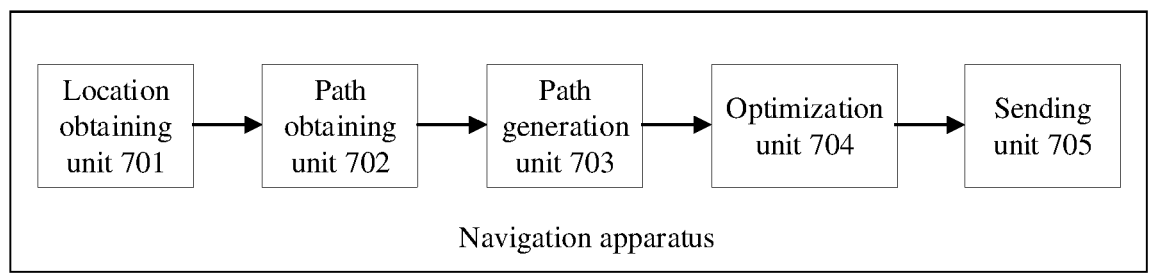
FIG. 18 is a schematic diagram of an embodiment of a navigation apparatus according to an embodiment of this application.

FIG. 18 is a schematic diagram of an embodiment of a navigation apparatus according to an embodiment of this application.

An embodiment of this application provides an embodiment of a navigation apparatus. The navigation apparatus may be applied to a server and includes:

a location obtaining unit 701, configured to obtain a first target location and a second target location, where the first target location is a location closest to a start location on K road segments, the second target location is a location closest to an end location on the K road segments, and K is a positive integer;

a path obtaining unit 702, configured to obtain a first path from the first target location to the second target location based on a vector pathfinding algorithm and the K road segments, where the path obtaining unit 702 is further configured to obtain a second path from the start location to the first target location and a third path from the second target location to the end location based on a raster pathfinding algorithm; and a path generation unit 703, configured to generate a fourth path from the start location to the end location based on the first path, the second path, and the third path, where the fourth path is for navigation.

In an implementation, the location obtaining unit 701 is configured to: determine, based on three-dimensional data of the start location and three-dimensional data of K road segments, a road segment closest to a start location on the K road segments; and determine the first target location from the road segment closest to the start location.

In an implementation, the location obtaining unit 701 is configured to: determine, from a plurality of layers of regions included in a walkable region and based on height data of the start location and height data of the walkable region, a target layer region in which the start location is located, where the target layer region is one of the plurality of layers of regions;

determine, based on height data of the K road segments, V road segments included in the target layer region in which the start location is located, where V is a positive integer less than or equal to K; and determine, from the V road segments and based on data of a horizontal direction of the start location and data of a horizontal direction of the V road segments, a road segment closest to the start location.

In an implementation, the location obtaining unit 701 is configured to: determine, from the K road segments and based on the data of the horizontal direction of the start location and the data of the horizontal direction of the K road segments, M road segments whose distances from the start location in a horizontal direction are less than a first threshold, where M is a positive integer less than or equal to K;

determine, from the M road segments and based on the height data of the start location and height data of the M road segments, N road segments that meet a target condition, where N is a positive integer less than or equal to M; and determine, from the N road segments and based on the three-dimensional data of the start location and the three-dimensional data of the K road segments, the road segment closest to the start location.

In an implementation, the target condition includes: a value of height data of a road segment is greater than a difference between a value of the height data of the start location and a third threshold, and is less than a sum of the value of the height data of the start location and a second threshold.

In an implementation, the second threshold is less than the third threshold.

In an implementation, the path obtaining unit 702 is configured to: obtain P rasters constituting a walkable region, where the P rasters include a raster corresponding to the start location and a raster corresponding to the end location, and P is a positive integer greater than 2;

select one candidate raster from Q candidate rasters as a raster corresponding to a third target location, where the Q candidate rasters belong to the P rasters, and Q is a positive integer less than P;

connect the raster corresponding to the start location and the raster corresponding to the third target location;

select one candidate raster from L candidate rasters as a raster corresponding to a fourth target location, where the L candidate rasters belong to the P rasters, and L is a positive integer less than P;

connect the raster corresponding to the third target location and the raster corresponding to the fourth target location; and repeat the foregoing steps until a raster corresponding to the first target location is connected, to obtain the second path from the start location to the first target location.

In an implementation, the L candidate rasters neither include the Q candidate rasters, nor include at least one raster that meets a target location relationship with the Q candidate rasters.

In an implementation, the path obtaining unit 702 is further configured to select the Q candidate rasters from the P rasters according to a selection rule, where the selection rule includes coordinates of a first horizontal direction of the candidate raster and coordinates of a second horizontal direction of the candidate raster, and the first horizontal direction is perpendicular to the second horizontal direction; the coordinates of the first horizontal direction of the candidate raster are equal to a sum of coordinates of a first horizontal direction of the raster corresponding to the start location and a first offset, the first offset is equal to a product of a first step and a cosine value of a first angle, the first step is equal to a sum of an initial step and a first step increment, the step increment is equal to a product of a first quantity of accumulation times and a step increment accumulated each time, the first angle is equal to a sum of an initial angle and a first angle increment, and the first angle increment is equal to a product of a second quantity of accumulation times and an angle increment accumulated each time; and the coordinates of the second horizontal direction of the candidate raster are equal to a sum of coordinates of a second horizontal direction of the raster corresponding to the start location and a second offset, and the second offset is equal to a product of the first step and a sine value of the first angle.

In an implementation, the navigation apparatus further includes an optimization unit 704, configured to optimize the fourth path.

In an implementation, the optimization unit 704 is configured to: determine an optimizable region in the walkable region; and optimize a part that is of the fourth path and that is located in the optimizable region.

In an implementation, a fifth target location and a sixth target location exist on the fourth path, and both the fifth target location and the sixth target location are located in the optimizable region.

The optimization unit 704 is configured to replace a non-linear path with a linear path from the fifth target location to the sixth target location based on a fact that no obstacle exists between the fifth target location and the sixth target location and a part that is of the fourth path and that is located between the fifth target location and the sixth target location is the non-linear path.

In an implementation, the navigation apparatus further includes a sending unit 705, configured to send the fourth path to a terminal device, so that the terminal device performs navigation based on the fourth path.

For specific implementations, related descriptions, and technical effects of the foregoing units, refer to related descriptions in FIG. 2 to FIG. 14 in embodiments of this application.

Figure 19:
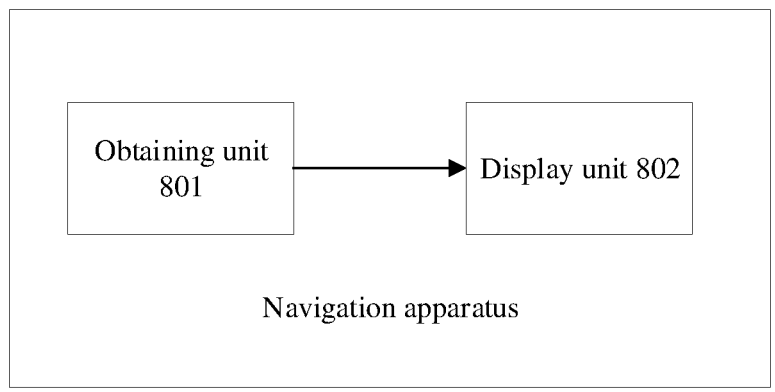
FIG. 19 is a schematic diagram of another embodiment of a navigation apparatus according to an embodiment of this application.

FIG. 19 is a schematic diagram of another embodiment of a navigation apparatus according to an embodiment of this application.

An embodiment of this application provides another embodiment of a navigation apparatus. The navigation apparatus includes:

an obtaining unit 801, configured to obtain a fourth path from a start location to an end location; and a display unit 802, configured to display the fourth path, where the display unit 802 is further configured to display a guiding line based on a location of a user and a location of the fourth path, where the guiding line indicates the user to move along the fourth path toward the end location.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location.

The display unit 802 is configured to display the guiding line from the location of the user to the second reference location based on a fact that the location of the user and the third reference location are on a same side of the first subpath and the location of the user is between an angle bisector of the target angle and the first subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location.

The display unit 802 is configured to display the guiding line from the location of the user to the third reference location based on a fact that the location of the user and the third reference location are on a same side of the first subpath and the location of the user is between an angle bisector of the target angle and the second subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location.

The display unit 802 is configured to display the guiding line from the location of the user to the second reference location based on a fact that the location of the user and the third reference location are on both sides of the first subpath and the location of the user and the first reference location are on a same side of a reverse extension line of the second subpath.

In an implementation, the fourth path is formed by sequentially connecting a plurality of reference locations, and two adjacent reference locations are connected to form a subpath; and the plurality of reference locations include a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location, or the third reference location is the end location.

The display unit 802 is configured to display the guiding line from the location of the user to the third reference location based on a fact that the location of the user and the third reference location are on both sides of the first subpath and the location of the user and the first reference location are on both sides of a reverse extension line of the second subpath.

In an implementation, the fourth path is formed by sequentially connecting a plurality of reference locations, a height of the guiding line at a fourth reference location is equal to a sum of a height of the fourth reference location and a specific height, and the fourth reference location is any one of the plurality of reference locations.

In an implementation, the fourth path is formed by sequentially connecting a plurality of reference locations.

The display unit 802 is further configured to display indication information based on a fact that the location of the user is located in an elevator region and attribute information of a fifth reference location indicates the user to take the elevator, where the indication information indicates the user to take the elevator, and the fifth reference location is a reference location closest to the location of the user in the plurality of reference locations.

For specific implementations, related descriptions, and technical effects of the foregoing units, refer to related descriptions in FIG. 15 to FIG. 17 in embodiments of this application.

Figure 20:
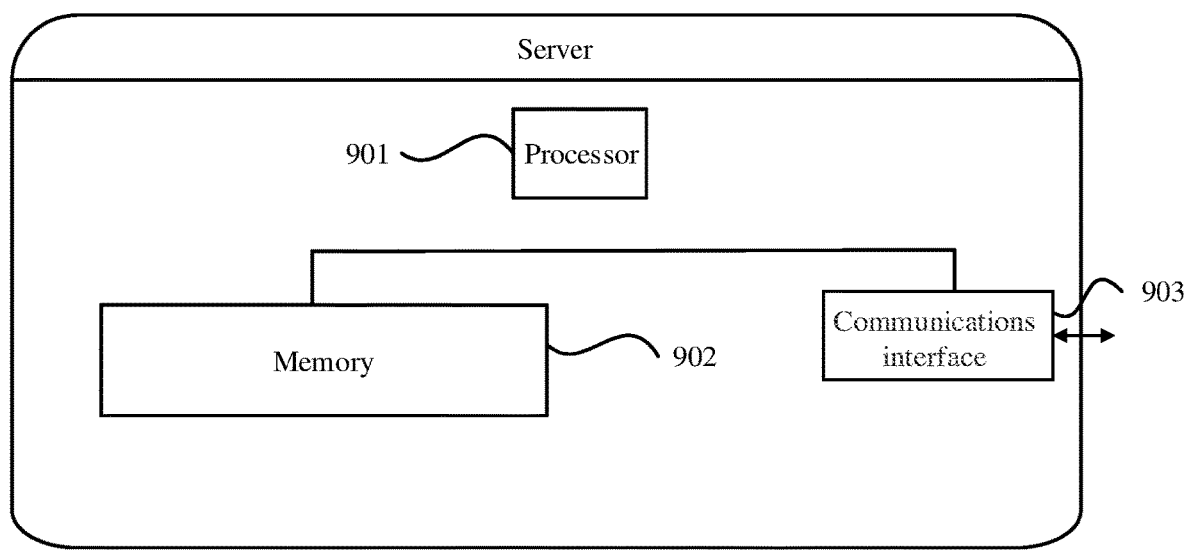
FIG. 20 is a schematic diagram of a structure of a server according to an embodiment of this application.

FIG. 20 is a schematic diagram of a structure of a server according to an embodiment of this application.

An embodiment of the computer device in this embodiment of this application may include one or more processors 901, a memory 902, and a communications interface 903.

The memory 902 may be for temporary storage or permanent storage. Still further, the processor 901 may be configured to: communicate with the memory 902, and perform, on the computer device, a series of instruction operations in the memory 902.

In this embodiment, the processor 901 may perform the steps in the embodiments shown in FIG. 3, FIG. 6, FIG. 7, FIG. 8, and FIG. 11. Details are not described herein again.

For example, the processor 901 may perform the following steps:
- obtaining a first target location and a second target location, where the first target location is a location closest to a start location on K road segments, the second target location is a location closest to an end location on the K road segments, and K is a positive integer;
- obtaining a first path from the first target location to the second target location based on a vector pathfinding algorithm and the K road segments;
- obtaining a second path from the start location to the first target location and a third path from the second target location to the end location based on a raster pathfinding algorithm; and
- generating a fourth path from the start location to the end location based on the first path, the second path, and the third path, where the fourth path is for navigation.

In this case, division into specific functional modules in the processor 901 may be similar to division into the functional modules such as the location obtaining unit, the path obtaining unit, and the path generation unit described in FIG. 18. Details are not described herein again.

Figure 21:
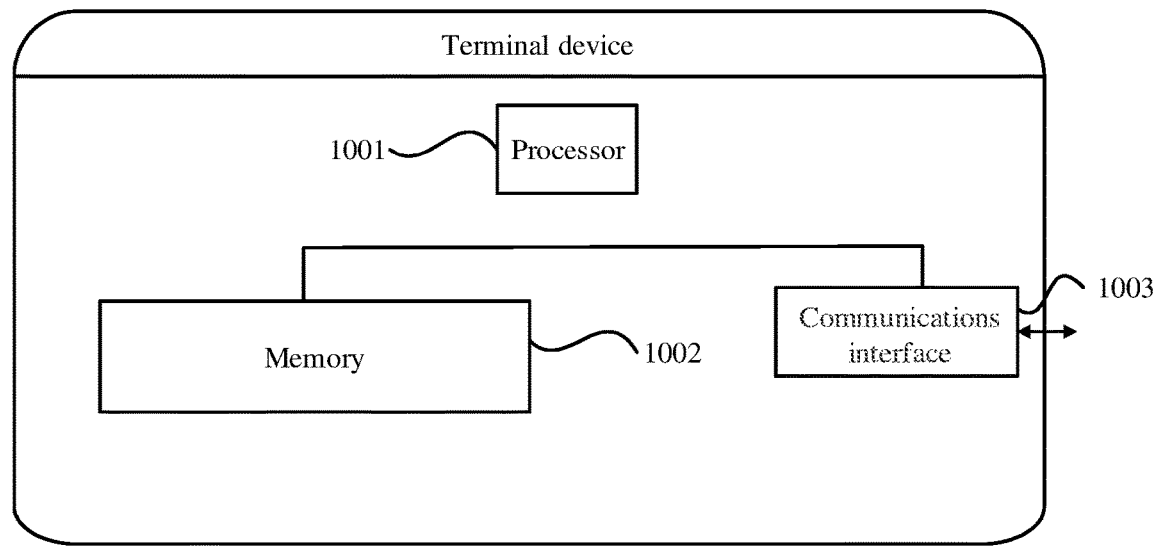
FIG. 21 is a schematic diagram of a structure of a terminal device according to an embodiment of this application.

FIG. 21 is a schematic diagram of a structure of a terminal device according to an embodiment of this application.

An embodiment of the computer device in this embodiment of this application may include one or more processors 1001, a memory 1002, and a communications interface 1003.

The memory 1002 may be for temporary storage or permanent storage. Still further, the processor 1001 may be configured to: communicate with the memory 1002, and perform, on the computer device, a series of instruction operations in the memory 1002.

In this embodiment, the processor 1001 may perform the steps in the embodiment shown in FIG. 15. Details are not described herein again.

For example, the processor 1001 may perform the following steps:
- obtaining a fourth path from a start location to an end location;
- displaying the fourth path; and
- displaying a guiding line based on a location of a user and a location of the fourth path, where the guiding line indicates the user to move along the fourth path toward the end location.

In this case, division into specific functional modules in the processor 1001 may be similar to division into the functional modules such as the obtaining unit and the display unit described in FIG. 19. Details are not described herein again.

An embodiment of this application further provides a chip or a chip system. The chip or the chip system includes at least one processor and a communications interface. The communications interface is interconnected to the at least one processor through a line. The at least one processor is configured to run a computer program or instructions, to perform the steps in the embodiments shown in FIG. 3, FIG. 6, FIG. 7, FIG. 8, and FIG. 11. Details are not described herein again.

The communications interface in the chip may be an input/output interface, a pin, a circuit, or the like.

An embodiment of this application further provides a first implementation of a chip or a chip system. The chip or the chip system described above in this application further includes at least one memory. The at least one memory stores instructions. The memory may be a storage unit inside the chip, for example, a register or a cache, or may be a storage unit (for example, a read-only memory or a random access memory) of the chip.

An embodiment of this application further provides a chip or a chip system. The chip or the chip system includes at least one processor and a communications interface. The communications interface is interconnected to the at least one processor through a line. The at least one processor is configured to run a computer program or instructions, to perform the steps in the embodiment shown in FIG. 15. Details are not described herein again.

The communications interface in the chip may be an input/output interface, a pin, a circuit, or the like.

An embodiment of this application further provides a first implementation of a chip or a chip system. The chip or the chip system described above in this application further includes at least one memory. The at least one memory stores instructions. The memory may be a storage unit inside the chip, for example, a register or a cache, or may be a storage unit (for example, a read-only memory or a random access memory) of the chip.

An embodiment of this application further provides a computer storage medium. The computer storage medium is configured to store computer software instructions used by a server, and includes a program designed for the server.

The server may be the navigation apparatus described in FIG. 18.

An embodiment of this application further provides a computer storage medium. The computer storage medium is configured to store computer software instructions used by a terminal device, and includes a program designed for the terminal device.

The terminal device may be the navigation apparatus described in FIG. 19.

An embodiment of this application further provides a computer program product. The computer program product includes computer software instructions, and the computer software instructions may be loaded by a processor to implement procedures in the methods shown in FIG. 3, FIG. 6, FIG. 7, FIG. 8, FIG. 11, and FIG. 15.

Figure 22:
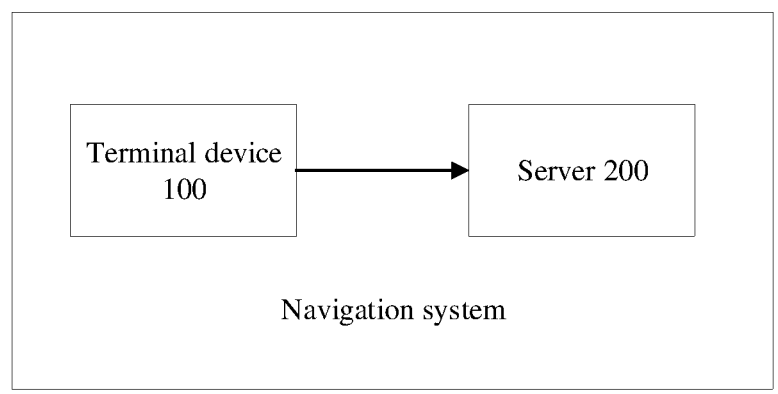
FIG. 22 is a schematic diagram of an embodiment of a navigation system according to an embodiment of this application.

FIG. 22 is a schematic diagram of an embodiment of a navigation system according to an embodiment of this application.

An embodiment of this application further provides an embodiment of a navigation system, including a terminal device 100 and a server 200.

The server 200 is configured to perform the steps in the embodiments shown in FIG. 3, FIG. 6, FIG. 7, FIG. 8, and FIG. 11.

The terminal device 100 is configured to perform the steps in the embodiment shown in FIG. 15.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A navigation method, comprising:
   obtaining a first target location and a second target location, wherein the first target location is a location closest to a start location on K road segments, the second target location is a location closest to an end location on the K road segments, and K is a positive integer;
   obtaining a first path from the first target location to the second target location based on a vector pathfinding algorithm and the K road segments;
   obtaining a second path from the start location to the first target location and a third path from the second target location to the end location based on a raster pathfinding algorithm; and
   generating a fourth path from the start location to the end location based on the first path, the second path, and the third path, wherein the fourth path is for navigating to the end location, and
   displaying the fourth path for guiding a user to move along the fourth path toward the end location,
   wherein the obtaining the first target location comprises:
   determining, based on three-dimensional data of the start location and three-dimensional data of the K road segments, a road segment closest to the start location on the K road segments, and
   determining the first target location from the road segment closest to the start location.

2. The method according to claim 1, wherein the determining, based on three-dimensional data of the start location and three-dimensional data of the K road segments, the road segment closest to the start location on the K road segments comprises:
   determining, from a plurality of layers of regions comprised in a walkable region and based on height data of the start location and height data of the walkable region, a target layer region in which the start location is located, wherein the target layer region is one of the plurality of layers of regions;
   determining, based on height data of the K road segments, V road segments comprised in the target layer region in which the start location is located, wherein V is a positive integer less than or equal to K; and
   determining, from the V road segments and based on data of a horizontal direction of the start location and data of a horizontal direction of the V road segments, a road segment closest to the start location.

3. The method according to claim 2, wherein the determining, based on three-dimensional data of the start location and three-dimensional data of the K road segments, the road segment closest to the start location on the K road segments comprises:
   determining, from the K road segments and based on the data of the horizontal direction of the start location and the data of the horizontal direction of the K road segments, M road segments of which distances from the start location in a horizontal direction are less than a first threshold, wherein M is a positive integer less than or equal to K;
   determining, from the M road segments and based on the height data of the start location and height data of the M road segments, N road segments that meet a target condition, wherein N is a positive integer less than or equal to M; and
   determining, from the N road segments and based on the three-dimensional data of the start location and the three-dimensional data of the K road segments, the road segment closest to the start location.

4. The method according to claim 3, wherein the target condition comprises: a value of height data of a road segment is greater than a difference between a value of the height data of the start location and a third threshold, and is less than a sum of the value of the height data of the start location and a second threshold.

5. The method according to claim 4, wherein the second threshold is less than the third threshold.

6. The method according to claim 1, wherein the obtaining the second path from the start location to the first target location based on a raster pathfinding algorithm comprises repeatedly performing raster pathfinding operations until a raster corresponding to the first target location is connected, to obtain the second path from the start location to the first target location, and the raster pathfinding operations include:
   obtaining P rasters constituting a walkable region, wherein the P rasters comprise a raster corresponding to the start location and a raster corresponding to the end location, and P is a positive integer greater than 2;

selecting one candidate raster from Q candidate rasters as a raster corresponding to a third target location, wherein the Q candidate rasters belong to the P rasters, and Q is a positive integer less than P;

connecting the raster corresponding to the start location and the raster corresponding to the third target location;

selecting one candidate raster from L candidate rasters as a raster corresponding to a fourth target location, wherein the L candidate rasters belong to the P rasters, and L is a positive integer less than P; and connecting the raster corresponding to the third target location and the raster corresponding to the fourth target location.

7. The method according to claim 6, wherein the L candidate rasters do not comprise the Q candidate rasters, or at least one raster that meets a target location relationship with the Q candidate rasters.

8. A navigation method, comprising:

obtaining a fourth path from a start location to an end location for navigating a user to the end location;

displaying the fourth path for guiding the user to move along the fourth path toward the end location; and displaying a guiding line based on a location of the user and a location of the fourth path, wherein the guiding line indicates the user to move along the fourth path toward the end location, wherein the fourth path is formed by sequentially connecting a plurality of reference locations, a height of the guiding line at a fourth reference location is equal to a sum of a height of the fourth reference location and a specific height, and the fourth reference location is any one of the plurality of reference locations.

9. The method according to claim 8, wherein two adjacent reference locations are connected to form a subpath; and the plurality of reference locations comprise a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location or is the end location; and the displaying the guiding line based on a location of the user and a location of the fourth path comprises:

displaying the guiding line from the location of the user to the second reference location based on determination that the location of the user and the third reference location are on a same side of the first subpath and the location of the user is between an angle bisector of the target angle and the first subpath.

10. The method according to claim 8, wherein two adjacent reference locations are connected to form the subpath; and the plurality of reference locations comprise a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location or is the end location; and the displaying the guiding line based on the location of a user and a location of the fourth path comprises:

displaying the guiding line from the location of the user to the third reference location based on determination that the location of the user and the third reference location are on a same side of the first subpath and the location of the user is between an angle bisector of the target angle and the second subpath.

11. The method according to claim 8, wherein two adjacent reference locations are connected to form the subpath; and the plurality of reference locations comprise a first reference location, a second reference location, and a third reference location that are sequentially connected, the first reference location is connected to the second reference location to form a first subpath, the second reference location is connected to the third reference location to form a second subpath, the first subpath and the second subpath form a target angle, the second reference location is a reference location closest to the location of the user in the plurality of reference locations, and the third reference location is located between the second reference location and the end location or is the end location; and the displaying the guiding line based on a location of the user and a location of the fourth path comprises:

displaying the guiding line from the location of the user to the second reference location based on determination that the location of the user and the third reference location are on both sides of the first subpath and the location of the user and the first reference location are on a same side of a reverse extension line of the second subpath.

12. The method according to claim 8, wherein the fourth path is formed by sequentially connecting the plurality of reference locations, and the method further comprises:

displaying indication information based on determination that the location of the user is located in an elevator region and attribute information of a fifth reference location indicates the user to take an elevator, wherein the indication information indicates the user to take the elevator, and the fifth reference location is a reference location closest to the location of the user in the plurality of reference locations.

13. A navigation apparatus, comprising:

at least one processor; and at least one processor memory coupled to the at least one processor to store program instructions, which, when executed by the processor, cause the at least one processor to:

obtain a first target location and a second target location, wherein the first target location is a location closest to a start location on K road segments, the second target location is a location closest to an end location on the K road segments, and K is a positive integer;

obtain a first path from the first target location to the second target location based on a vector pathfinding algorithm and the K road segments;

obtain a second path from the start location to the first target location and a third path from the second target location to the end location based on a raster pathfinding algorithm;

generate a fourth path from the start location to the end location based on the first path, the second path, and the third path, wherein the fourth path is for navigating to the end location; and display the fourth path for guiding a user to move along the fourth path toward the end location, wherein the obtaining of the first target location comprises:

determining, based on three-dimensional data of the start location and three-dimensional data of the K road segments, a road segment closest to the start location on the K road segments; and determining the first target location from the road segment closest to the start location.

14. The apparatus according to claim 13, wherein the determining, based on three-dimensional data of the start location and three-dimensional data of the K road segments, a road segment closest to the start location on the K road segments comprises:

determining, from a plurality of layers of regions comprised in a walkable region and based on height data of the start location and height data of the walkable region, a target layer region in which the start location is located, wherein the target layer region is one of the plurality of layers of regions;

determining, based on height data of the K road segments, V road segments comprised in the target layer region in which the start location is located, wherein V is a positive integer less than or equal to K; and determining, from the V road segments and based on data of a horizontal direction of the start location and data of a horizontal direction of the V road segments, a road segment closest to the start location.

15. The apparatus according to claim 14, wherein the determining, based on three-dimensional data of the start location and three-dimensional data of the K road segments, a road segment closest to the start location on the K road segments comprises:

determining, from the K road segments and based on the data of the horizontal direction of the start location and the data of the horizontal direction of the K road segments, M road segments of which distances from the start location in a horizontal direction are less than a first threshold, wherein M is a positive integer less than or equal to K;

determining, from the M road segments and based on the height data of the start location and height data of the M road segments, N road segments that meet a target condition, wherein N is a positive integer less than or equal to M; and determining, from the N road segments and based on the three-dimensional data of the start location and the three-dimensional data of the K road segments, the road segment closest to the start location.

16. The apparatus according to claim 15, wherein the target condition comprises: a value of height data of a road segment is greater than a difference between a value of the height data of the start location and a third threshold, and is less than a sum of the value of the height data of the start location and a second threshold.

17. The apparatus according to claim 16, wherein the second threshold is less than the third threshold.

\* \* \* \* \*